(12) United States Patent
Saeki et al.

(10) Patent No.: US 10,853,387 B2
(45) Date of Patent: Dec. 1, 2020

(54) DATA RETRIEVAL APPARATUS, PROGRAM AND RECORDING MEDIUM

(71) Applicant: INFORMEX, INC., Tokyo (JP)

(72) Inventors: Joji Saeki, Tokyo (JP); Takuya Saeki, Tokyo (JP); Shinya Saeki, Tokyo (JP)

(73) Assignee: INFORMEX, INC., Tokyo (JP)

( * ) Notice: Subject to any disclaimer, the term of this patent is extended or adjusted under 35 U.S.C. 154(b) by 428 days.

(21) Appl. No.: 15/885,042

(22) Filed: Jan. 31, 2018

(65) Prior Publication Data

US 2018/0157683 A1    Jun. 7, 2018

Related U.S. Application Data

(63) Continuation of application No. 15/506,095, filed as application No. PCT/JP2015/082316 on Nov. 17, 2015, now Pat. No. 9,922,054.

(30) Foreign Application Priority Data

Nov. 19, 2014    (JP) .................................. 2014-234228

(51) Int. Cl.
    *G06F 16/00*    (2019.01)
    *G06F 16/27*    (2019.01)
    (Continued)

(52) U.S. Cl.
    CPC .............. *G06F 16/27* (2019.01); *G06F 12/00* (2013.01); *G06F 16/00* (2019.01);
    (Continued)

(58) Field of Classification Search
    CPC .................................................. G06F 16/2245
    See application file for complete search history.

(56) References Cited

U.S. PATENT DOCUMENTS

| 7,165,064 B2 | 1/2007 | Saeki | |
| 2010/0185659 A1* | 7/2010 | Bai | G06F 16/3334 |
| | | | 707/769 |
| 2014/0250127 A1* | 9/2014 | Rhinelander | G06F 16/285 |
| | | | 707/739 |

FOREIGN PATENT DOCUMENTS

| JP | 09-319753 | 12/1997 |
| JP | 10-063594 | 3/1998 |

(Continued)

OTHER PUBLICATIONS

International Search Report (ISR) in International Pat. Appl. No. PCT/JP2015/082316, dated Feb. 23, 2016.

*Primary Examiner* — Ajith Jacob
(74) *Attorney, Agent, or Firm* — Greenblum & Bernstein, P.L.C.

(57) ABSTRACT

A data retrieval apparatus includes a processor, a memory and a business intelligence circuit. The memory stores a data dictionary including presentation structure definition information for assisting input of a user terminal to issue a retrieval request compliant with a retrieval requirement, and retrieval request definition information for managing relevance between different retrieval requests. The business intelligence circuit assists input of the user terminal according to a presentation structure defined in the data dictionary to issue a retrieval request described according to the presentation structure, and outputs a retrieval result based on the retrieval request, the retrieval result being obtained from the databases, to the user terminal. The data retrieval apparatus associates retrieval results prepared in response to different retrieval requests with each other according to the retrieval request definition information.

14 Claims, 20 Drawing Sheets

(51) Int. Cl.
  *G06F 16/90* (2019.01)
  *G06F 16/248* (2019.01)
  *G06F 16/22* (2019.01)
  *G06F 12/00* (2006.01)
  *G06F 16/242* (2019.01)
  *G06Q 10/10* (2012.01)
  *G06F 3/0482* (2013.01)

(52) U.S. Cl.
  CPC ........ *G06F 16/2246* (2019.01); *G06F 16/248* (2019.01); *G06F 16/2445* (2019.01); *G06F 16/90* (2019.01); *G06Q 10/103* (2013.01); *G06F 3/0482* (2013.01)

(56) References Cited

FOREIGN PATENT DOCUMENTS

| | | |
|---|---|---|
| JP | 3213585 | 7/2001 |
| JP | 2009-245282 | 10/2009 |

* cited by examiner

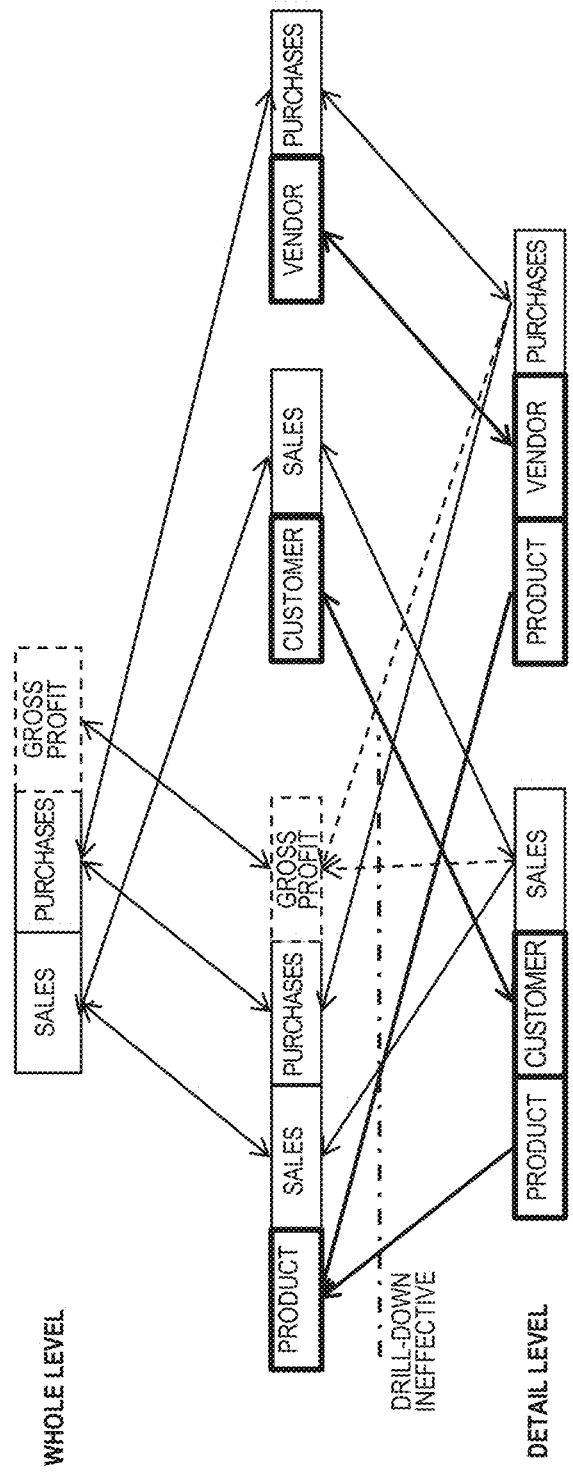
FIG. 1 EXAMPLE OF INCONSISTENCY AT LOW GRANURALITY (DETAILED DATA DO NOT INCLUDE COMMON KEY ITEMS)

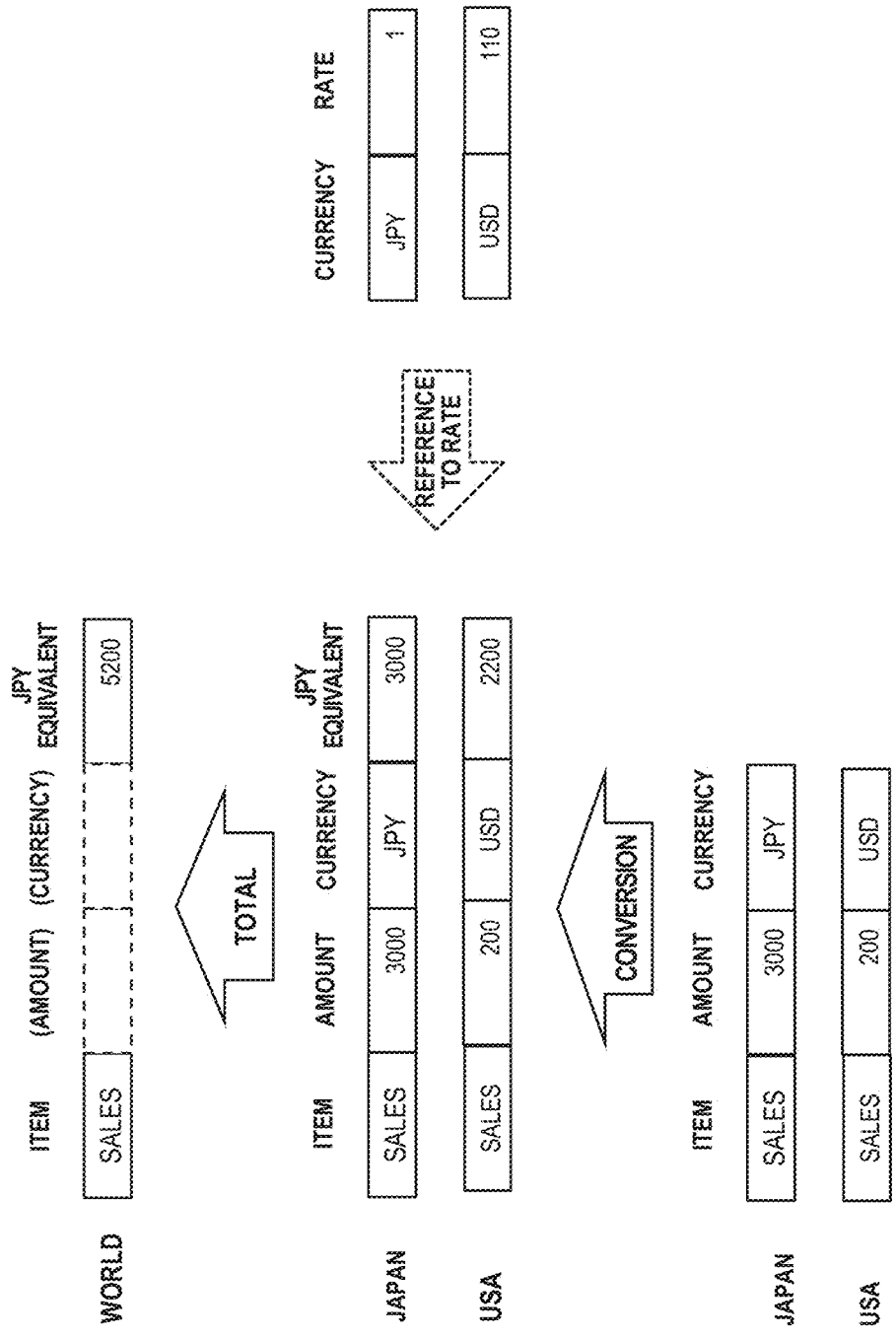
FIG. 2 <EXAMPLE OF INCONSISTENCY AT HIGH GRANULARITY (CONSTRAINTS AND LIMITATIONS OF PROCESS FOR INTEGRATION INTO AGGREGATED DATA)>-2

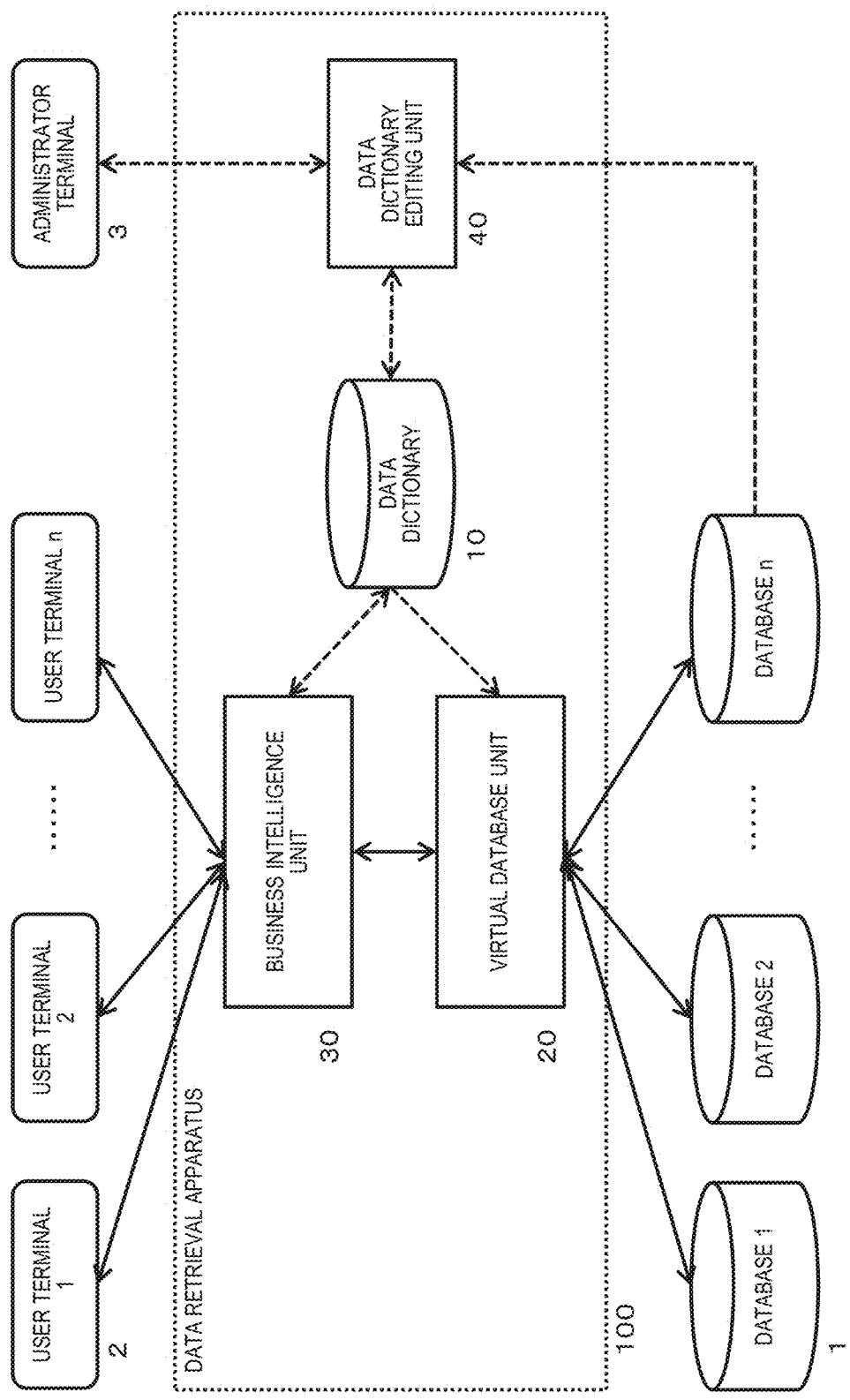
FIG. 3 CONFIGURATION DIAGRAM OF OVERALL SYSTEM

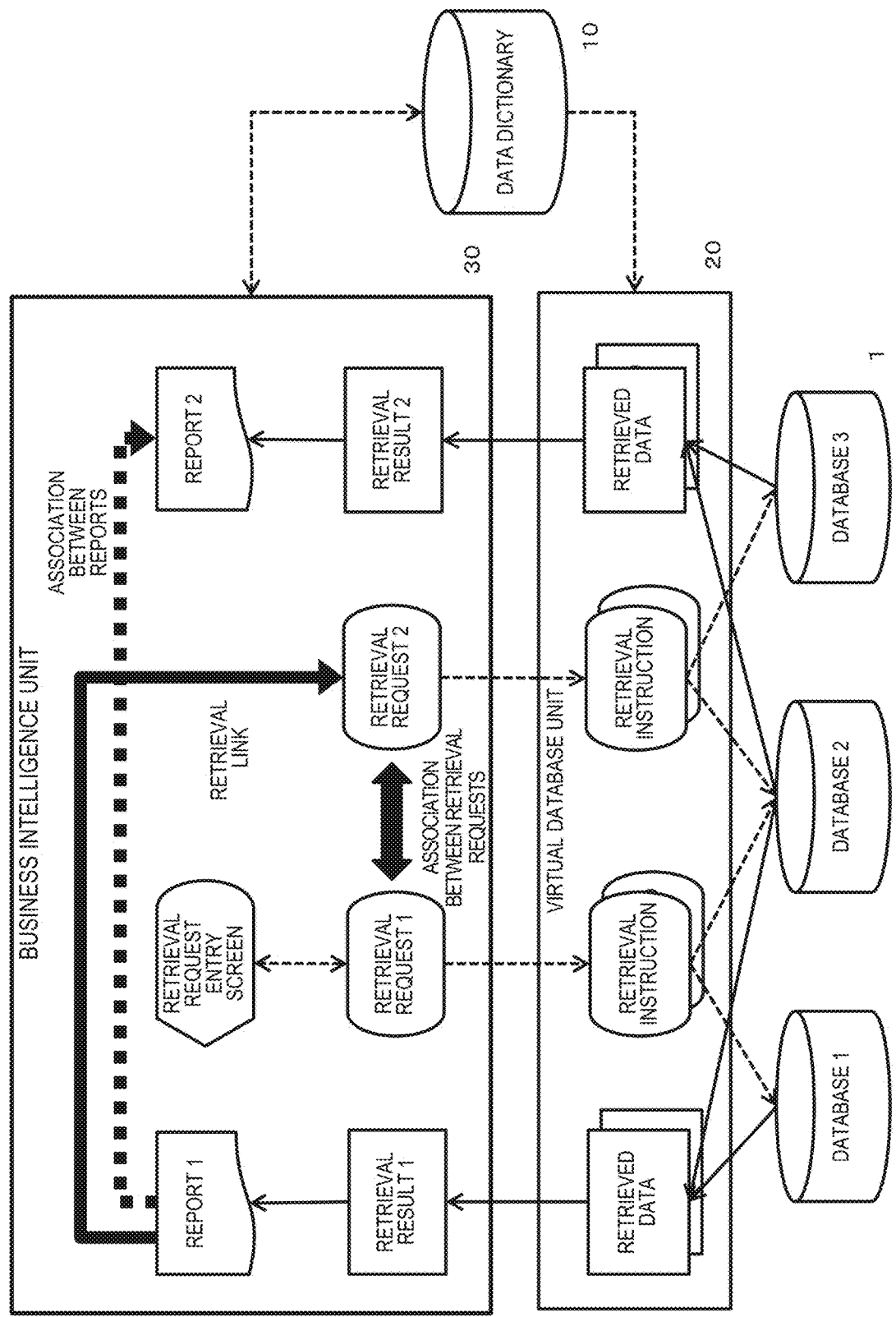
FIG. 4 CONCEPTUAL DIAGRAM OF PROCESS FOR ANALYZING DATA INCLUDING INCONSISTENCY

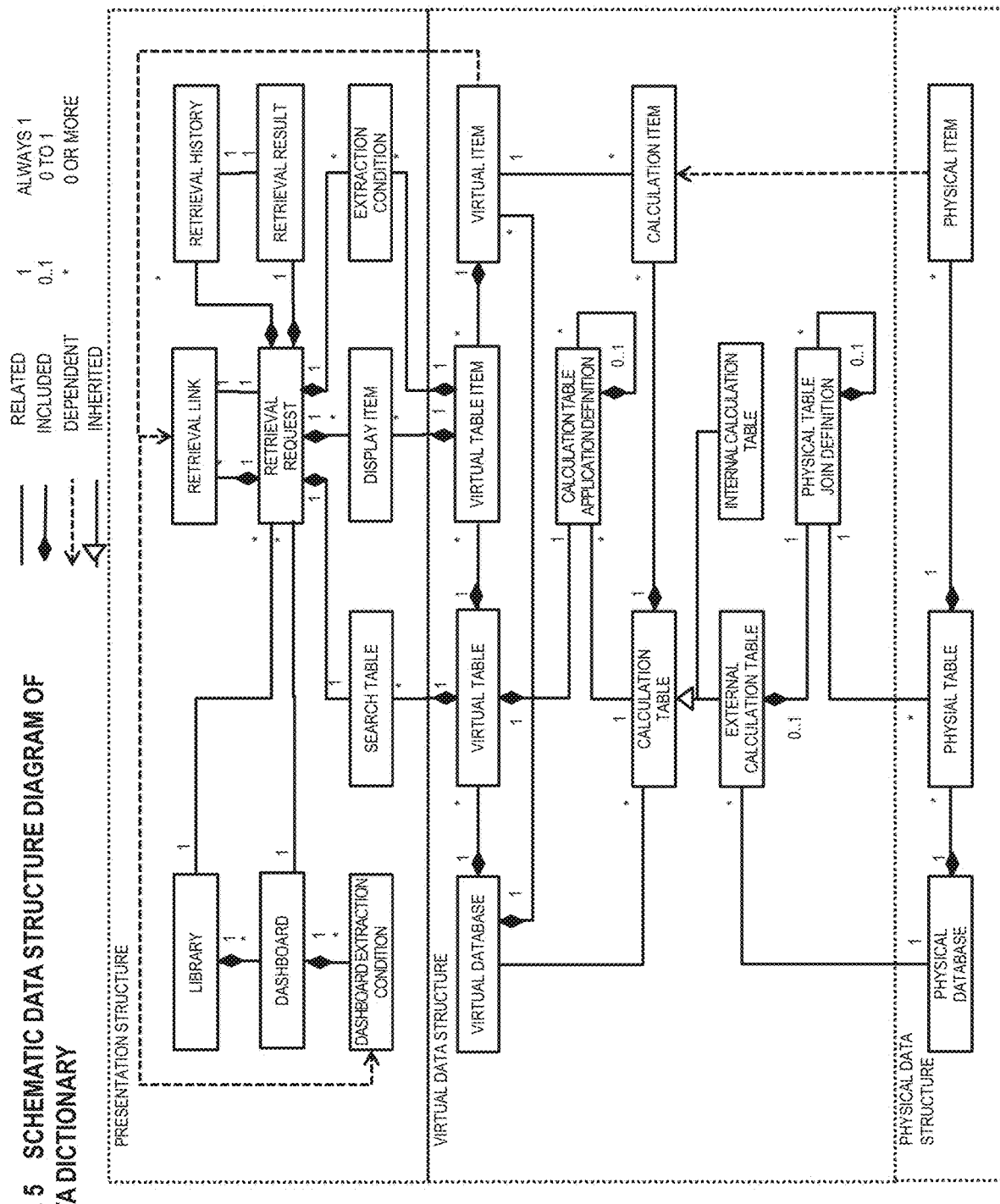
FIG. 5 SCHEMATIC DATA STRUCTURE DIAGRAM OF DATA DICTIONARY

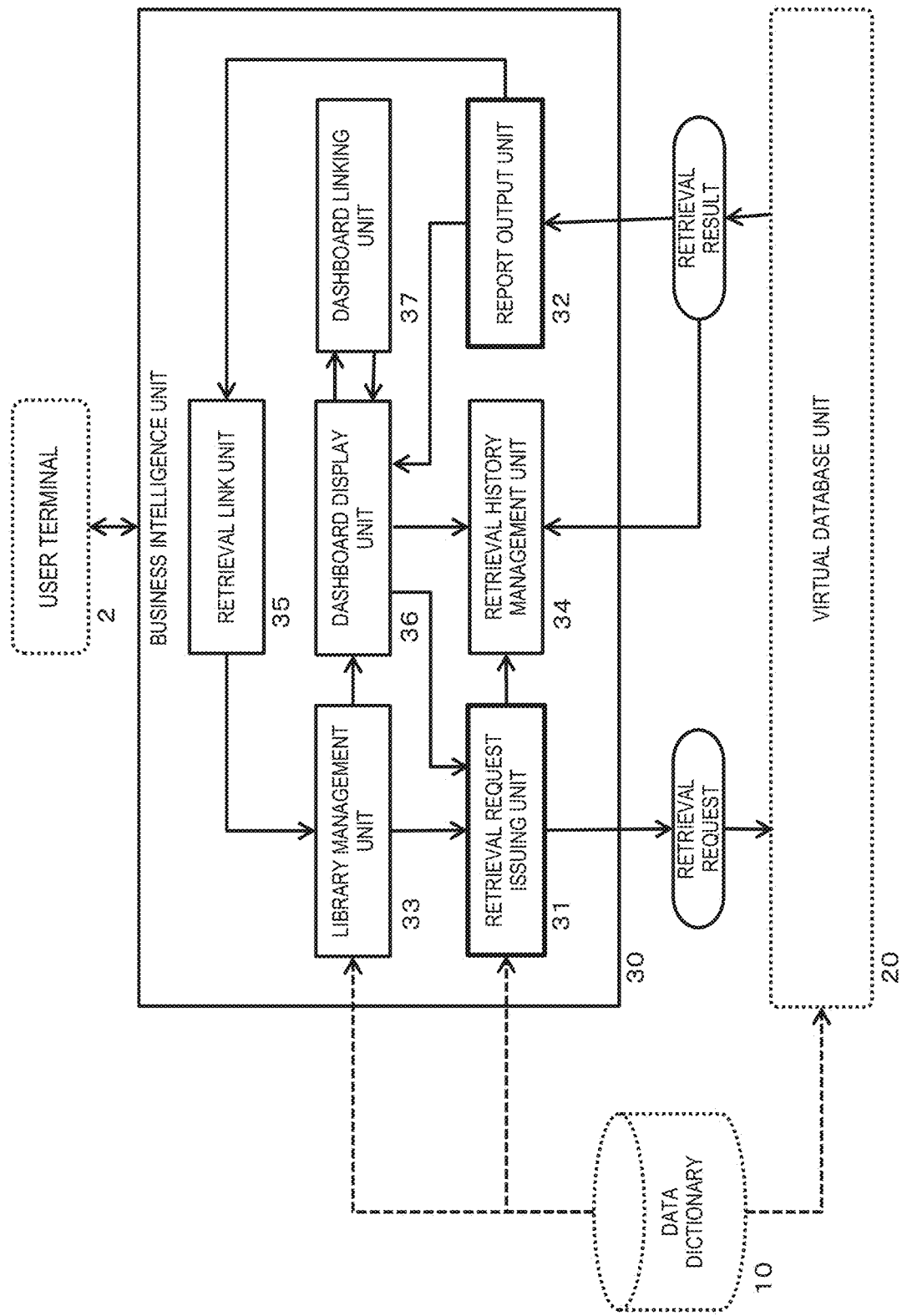
FIG. 6 FUNCTIONAL BLOCK DIAGRAM OF BUSINESS INTELLIGENCE UNIT

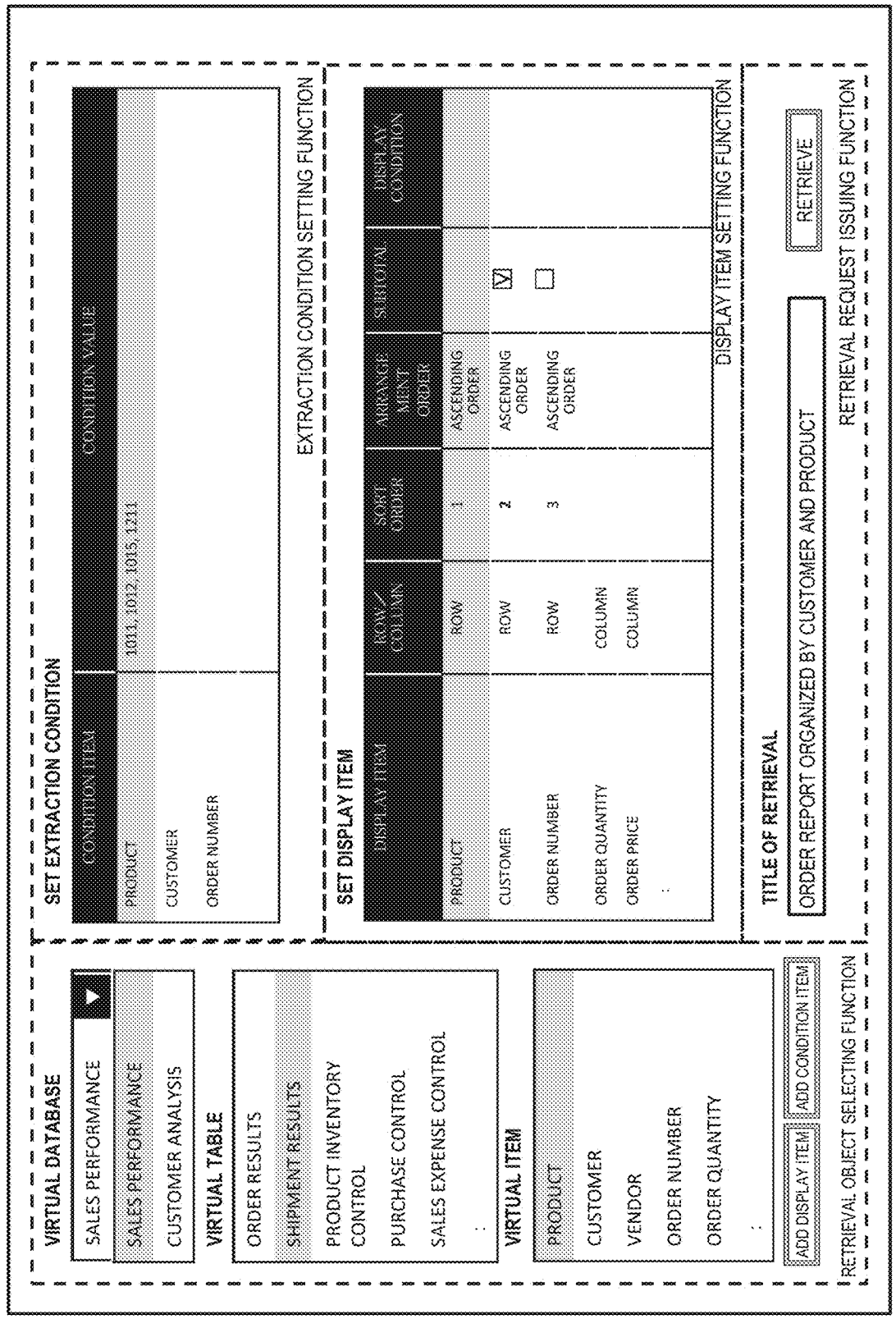
FIG. 7 IMAGE OF SCREEN FOR ISSUING RETRIEVAL REQUEST

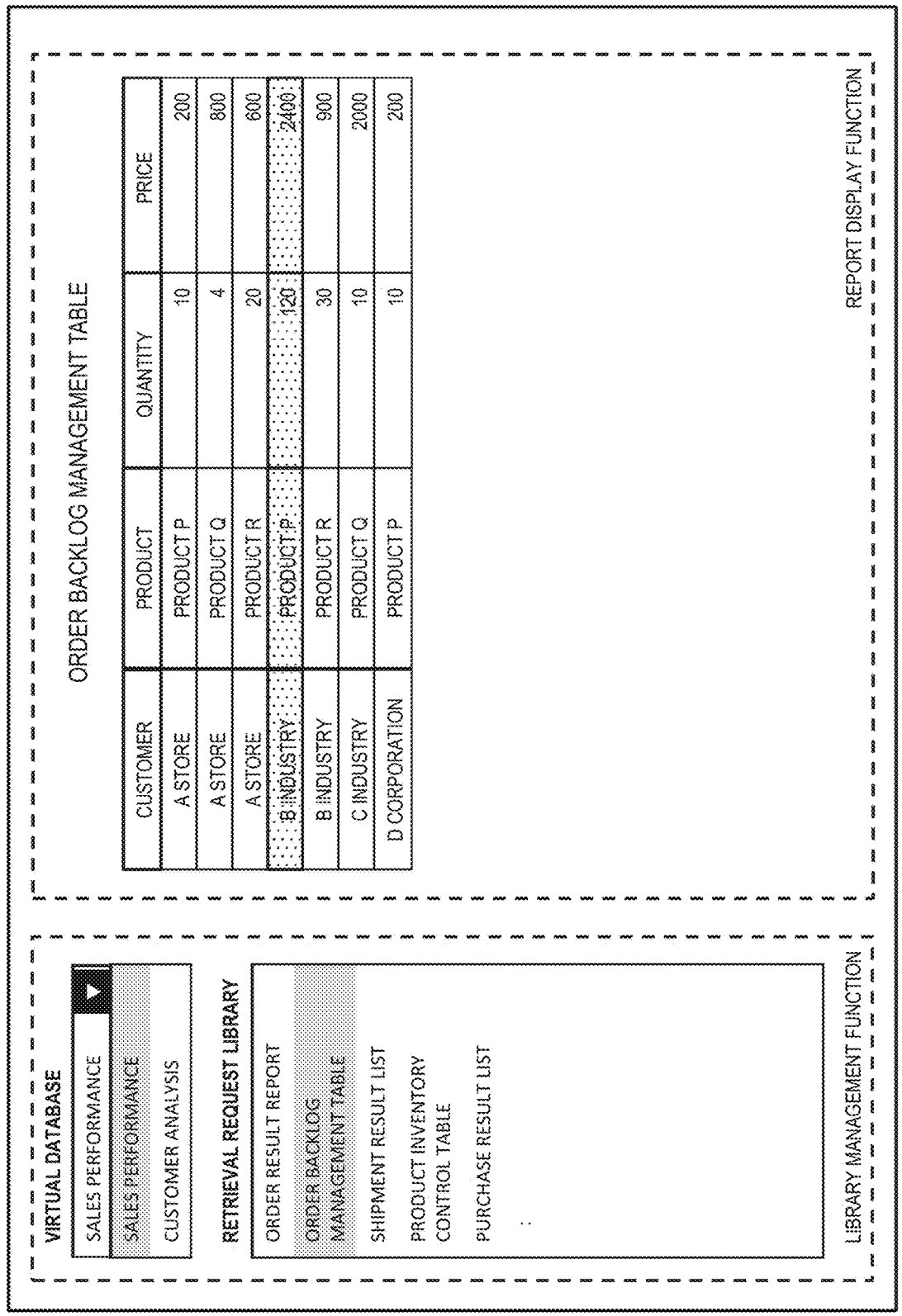
FIG. 8 IMAGE OF SCREEN FOR LIBRARY MANAGEMENT

FIG. 9 IMAGE OF SCREEN OPERATION OF RETRIEVAL LINKING FUNCTION
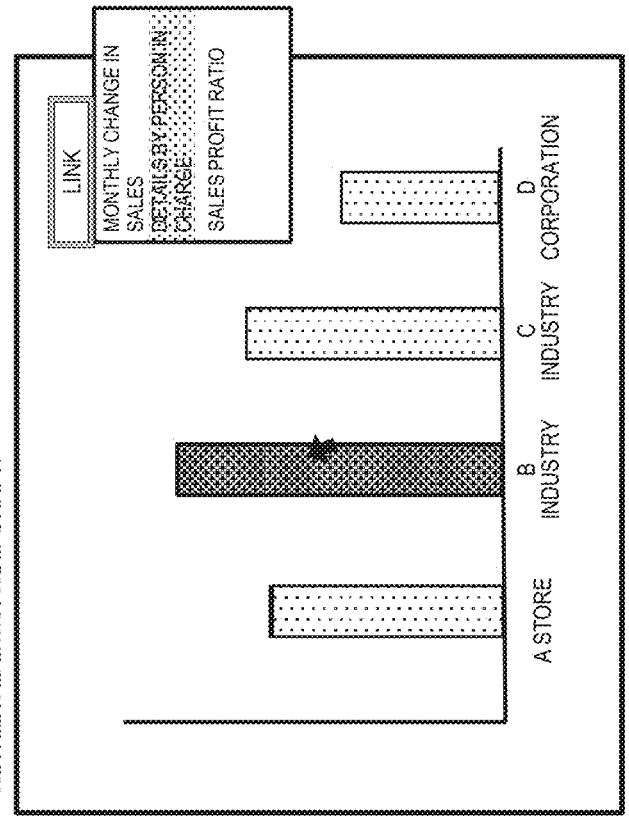

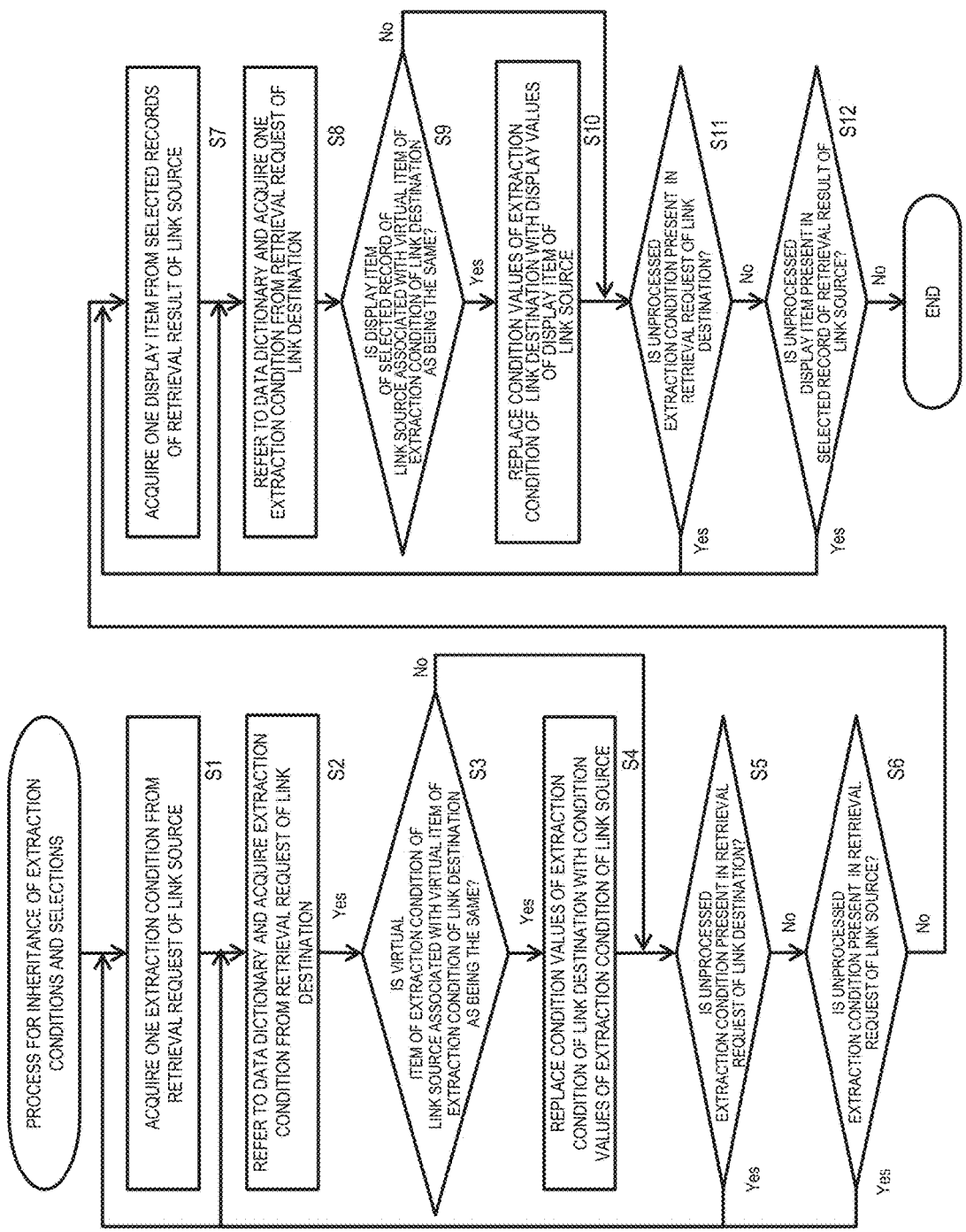
FIG. 10  PROCESS FOR INHERITANCE OF EXTRACTION CONDITIONS AND SELECTIONS THROUGH RETRIEVAL LINK

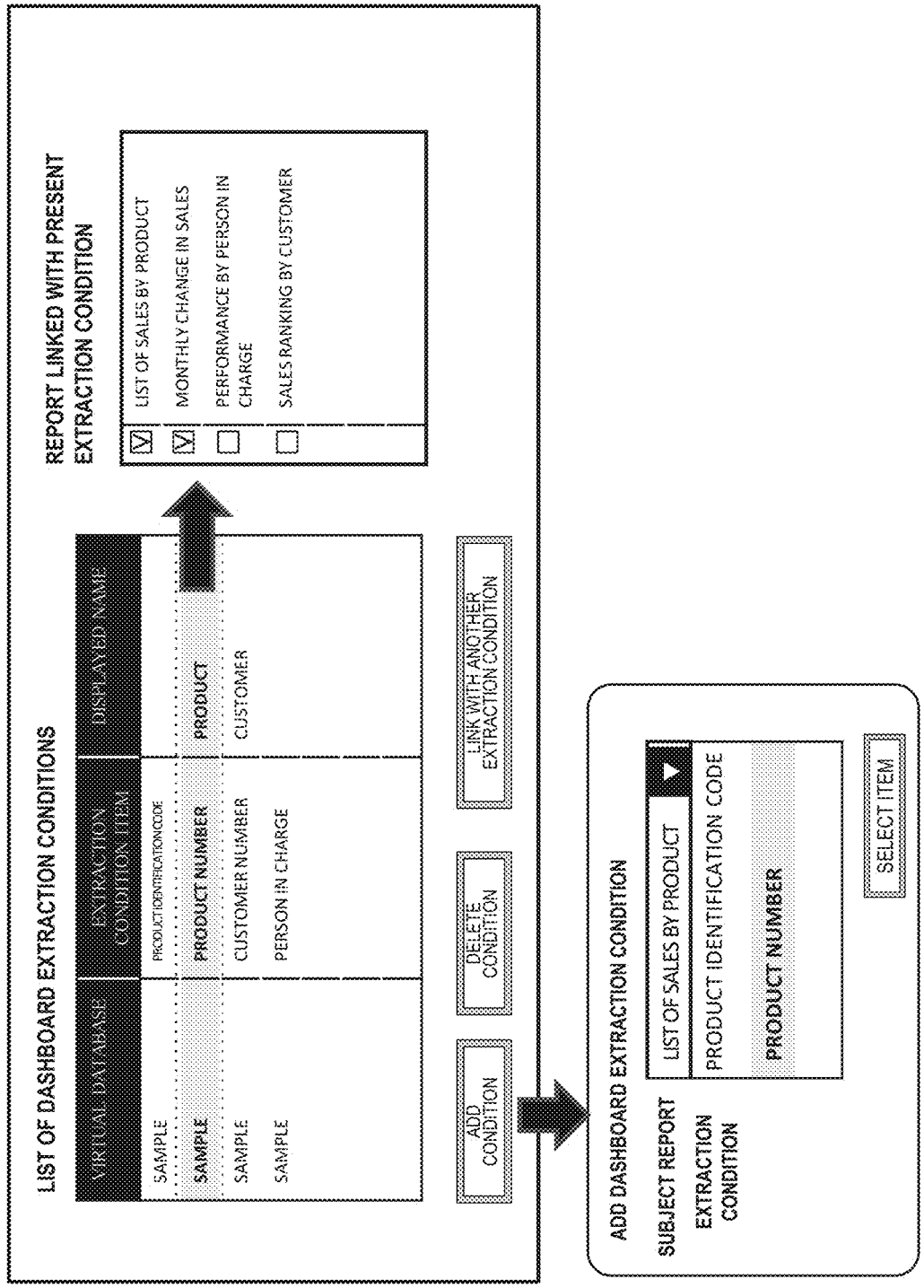
FIG. 11 SCREEN FOR SETTING EXTRACTION CONDITION LINKING BETWEEN A PLURALITY OF REPORTS IN DASHBOARD

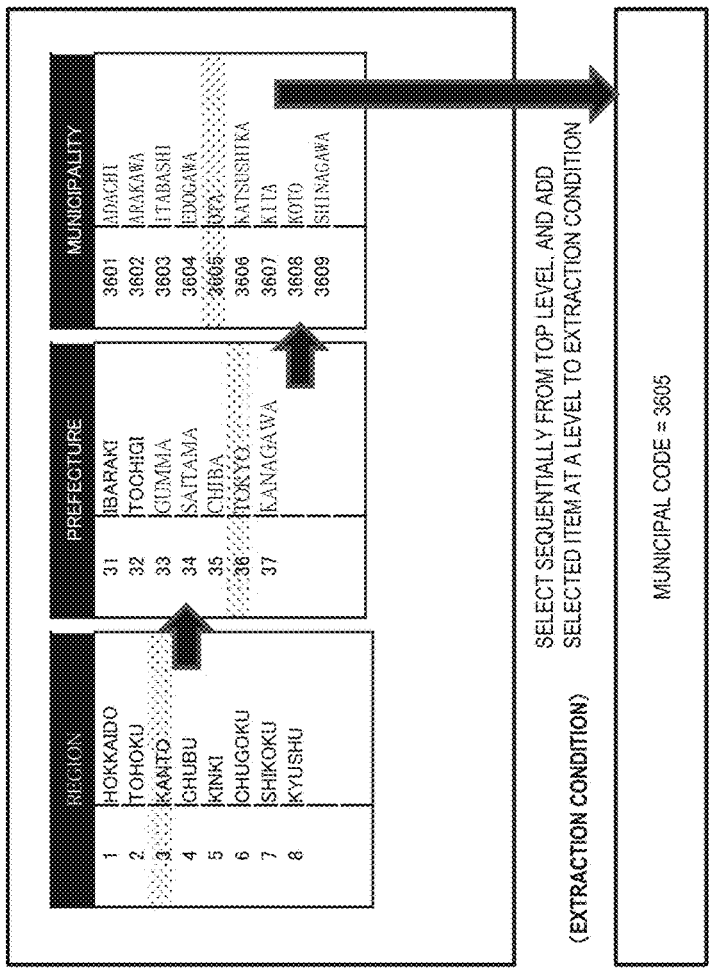
FIG. 12 IMAGE OF OPERATION OF SCREEN FOR SETTING EXTRACTION CONDITION BY CLASS VIRTUAL ITEM

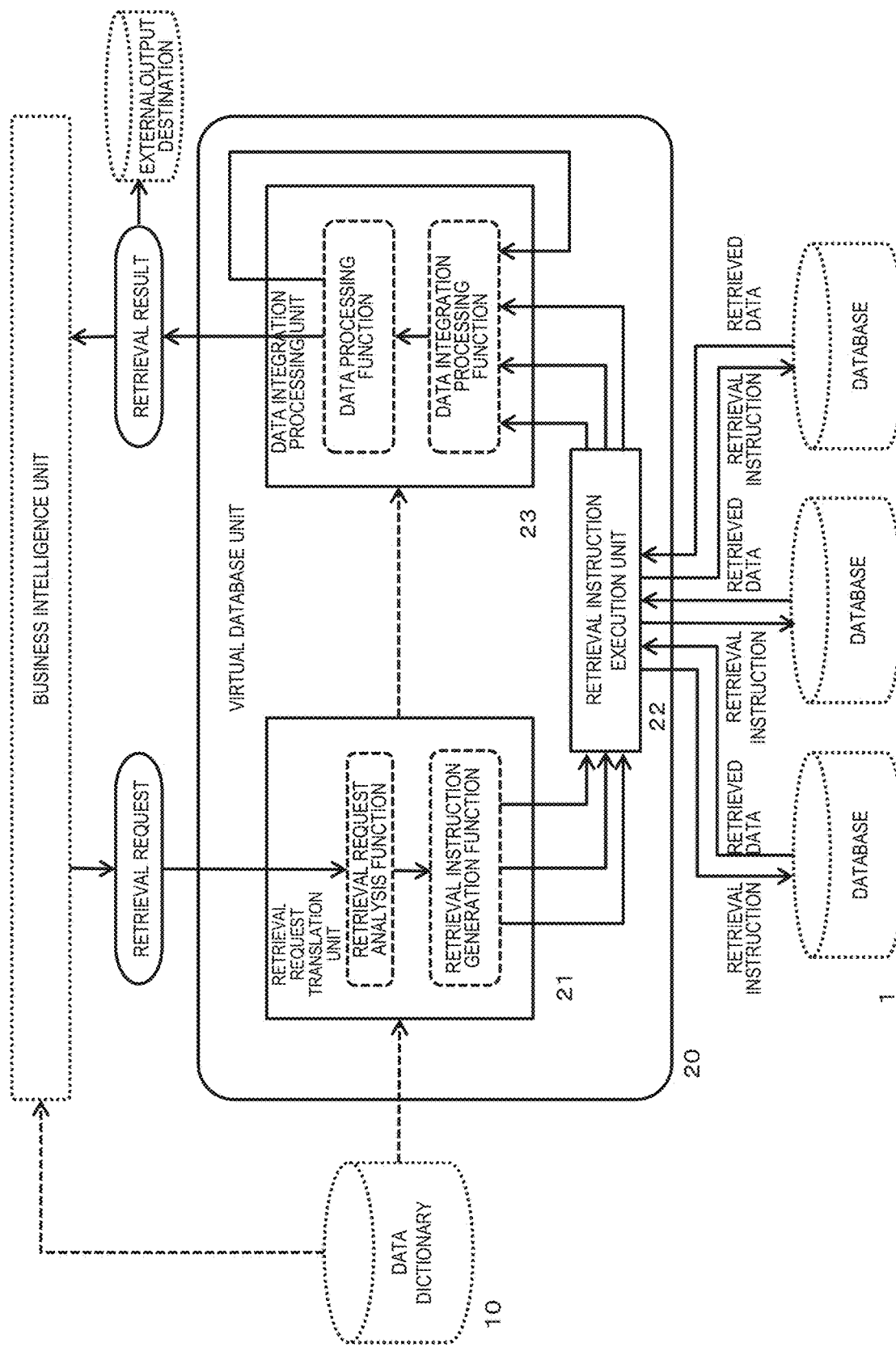
FIG. 13 FUNCTIONAL BLOCK DIAGRAM OF VIRTUAL DATABASE UNIT

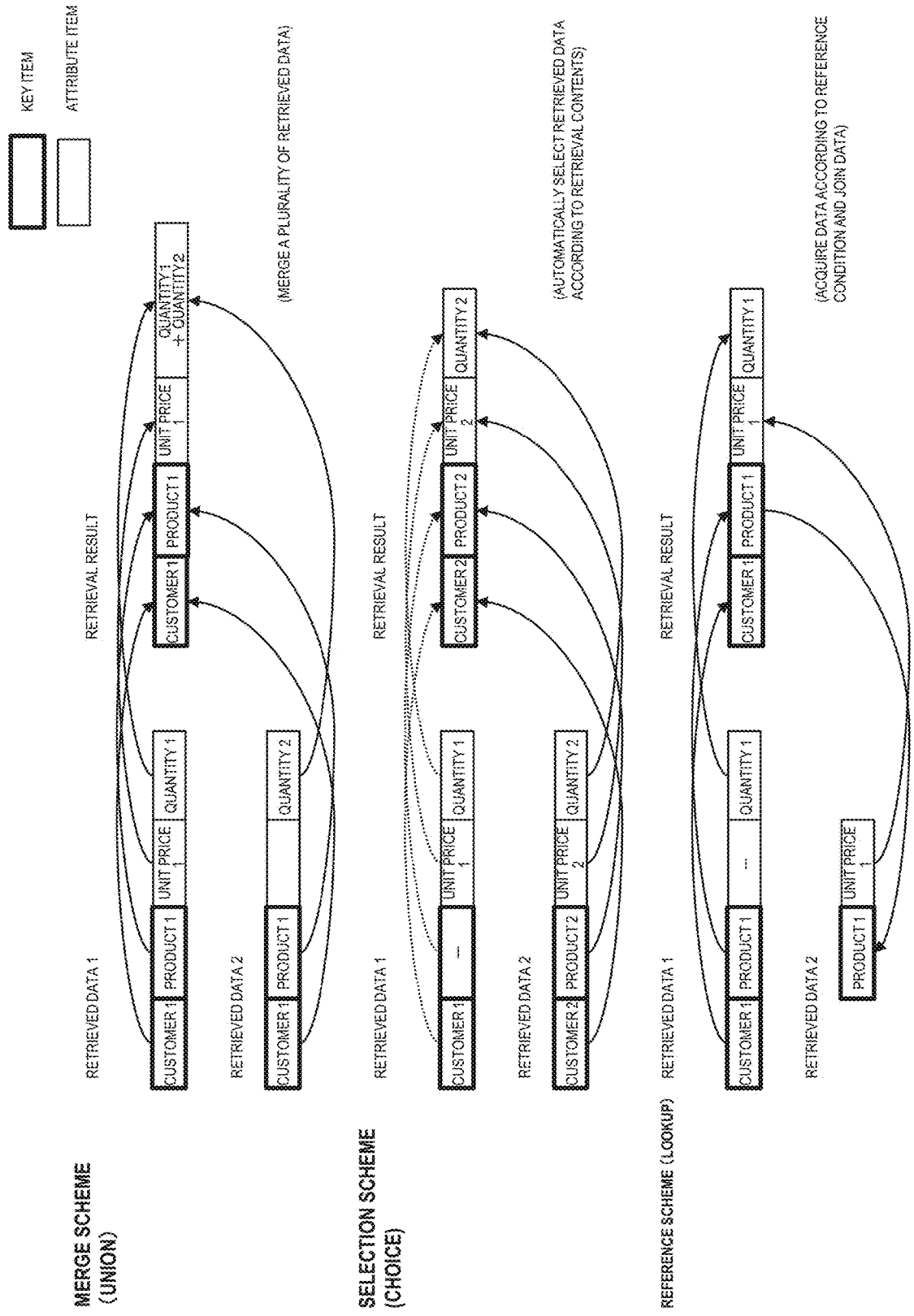

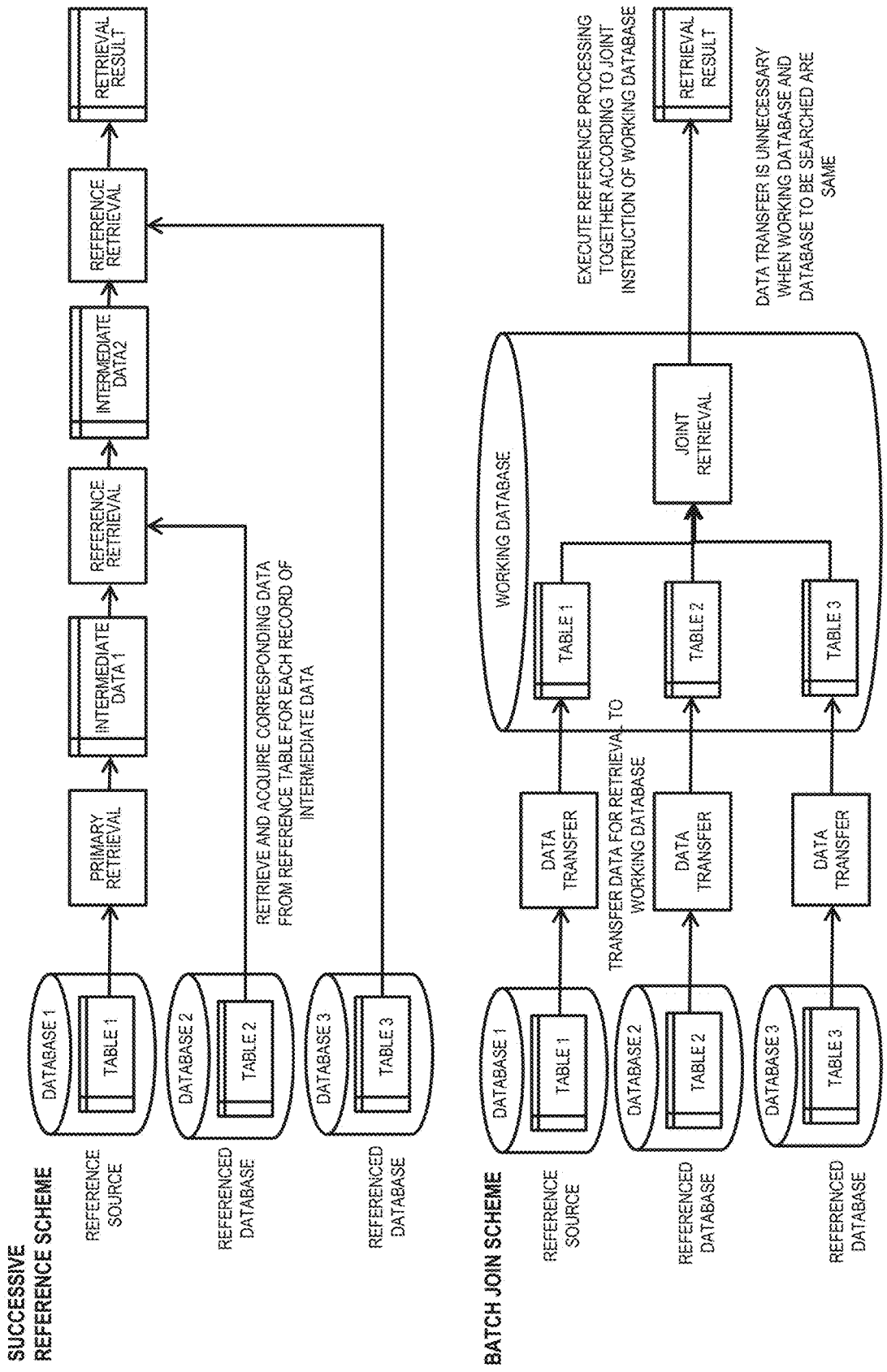
FIG. 15A CONCEPTUAL DIAGRAM OF PROCESSING IN A PLURALITY OF REFERENCE PROCESSING SCHEMES

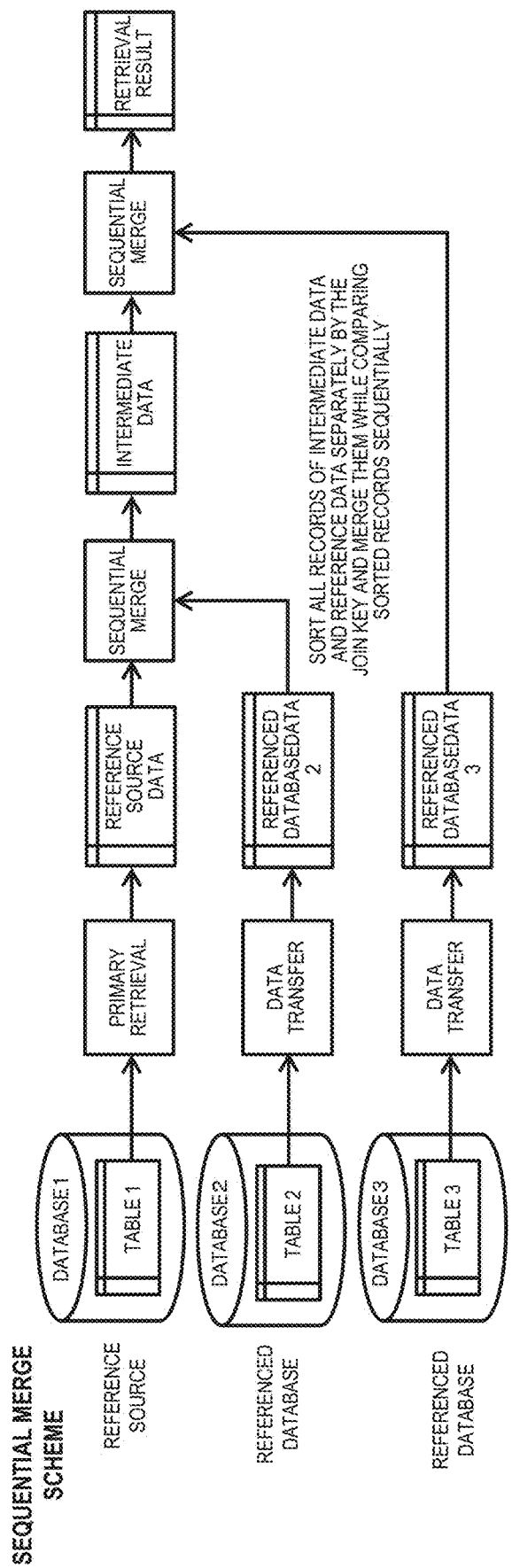
FIG. 15B CONCEPTUAL DIAGRAM OF PROCESSING IN A PLURALITY OF REFERENCE PROCESSING SCHEMES (CONTINUATION)

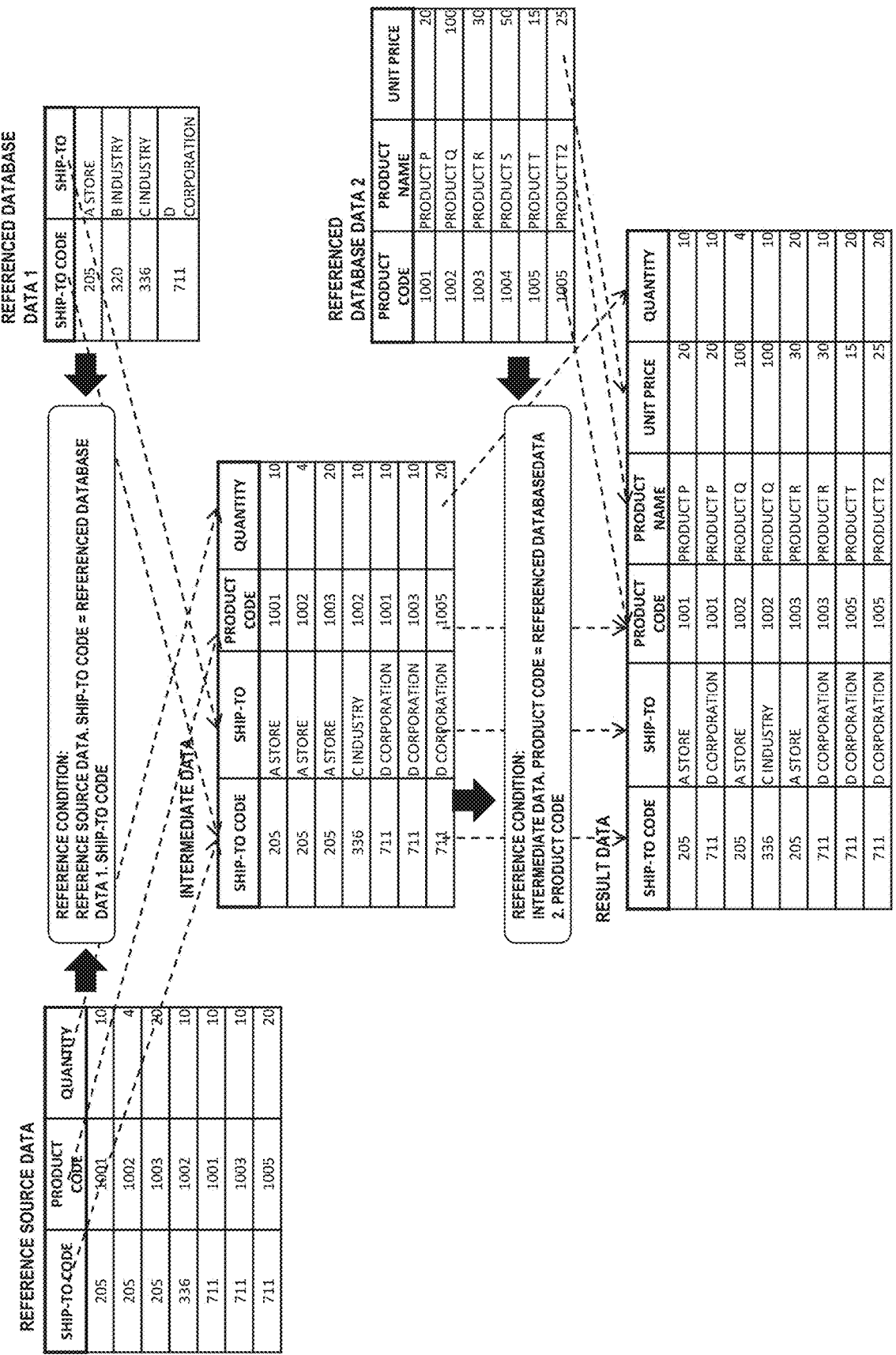
FIG. 16 CONCEPTUAL DIAGRAM OF PROCESSING IN SEQUENTIAL MERGE SCHEME

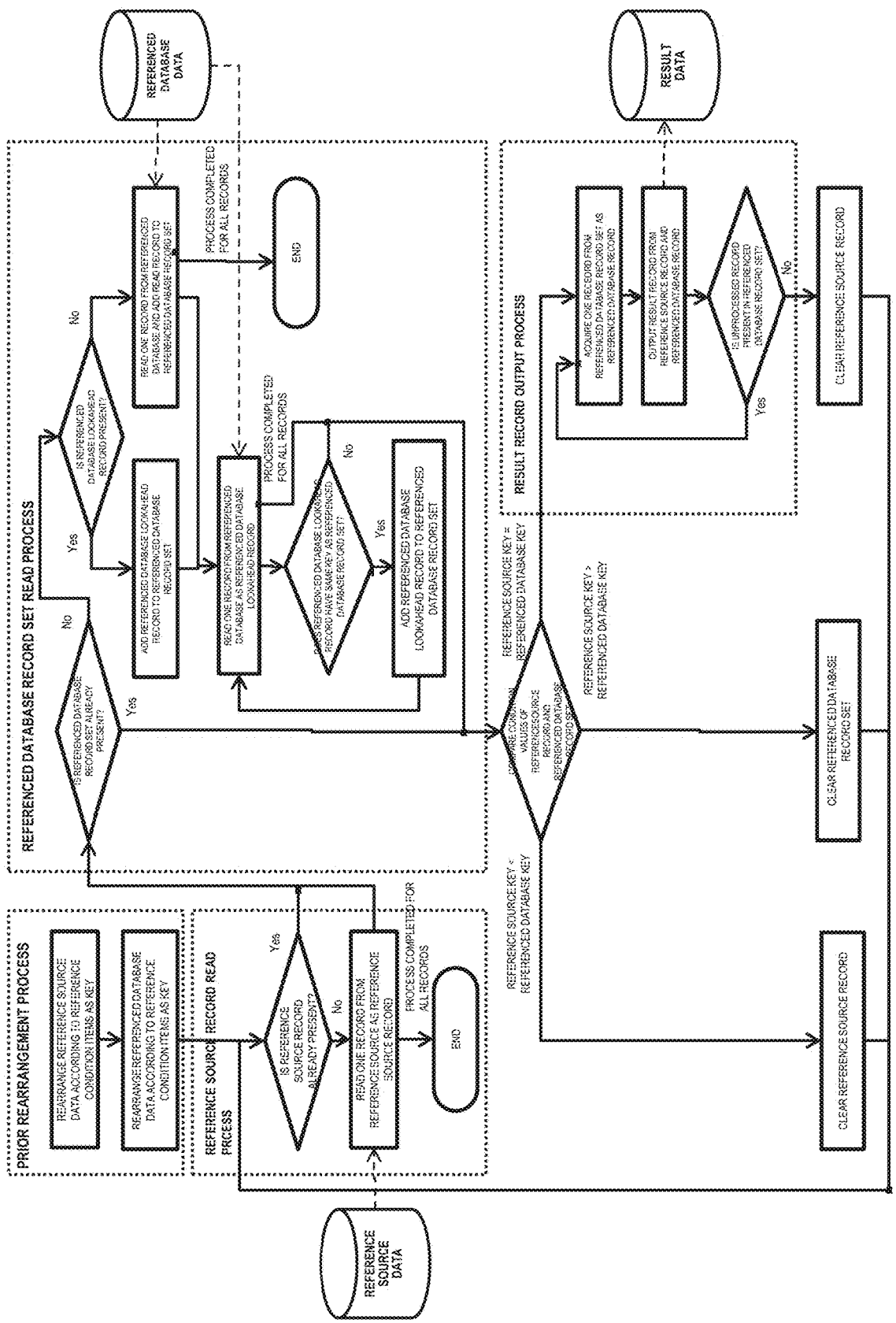
FIG. 17 FLOWCHART OF PROCESSING IN SEQUENTIAL MERGE SCHEME

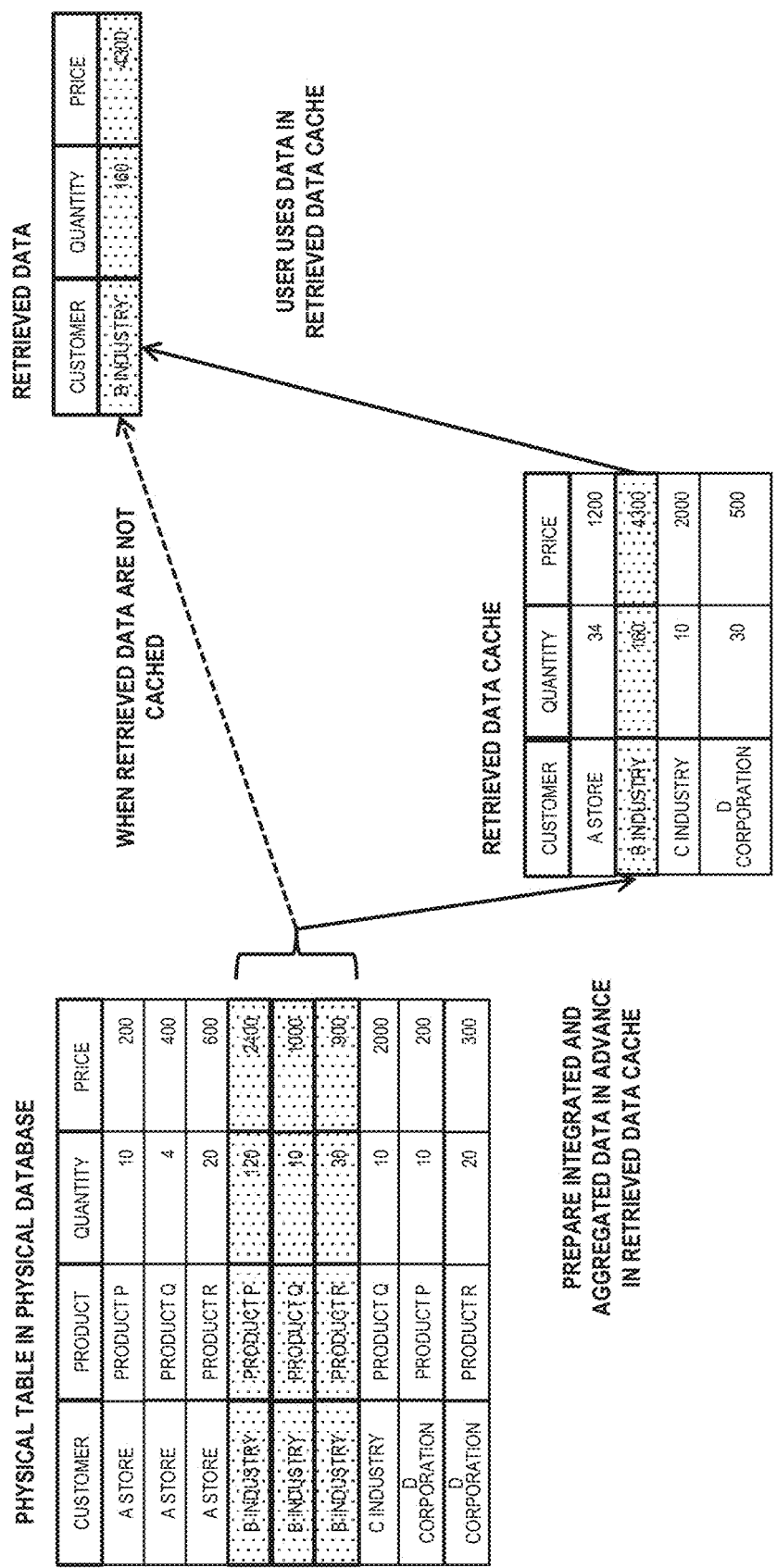
FIG. 18 CONCEPTUAL DIAGRAM OF PROCESSING OF DATA CACHE

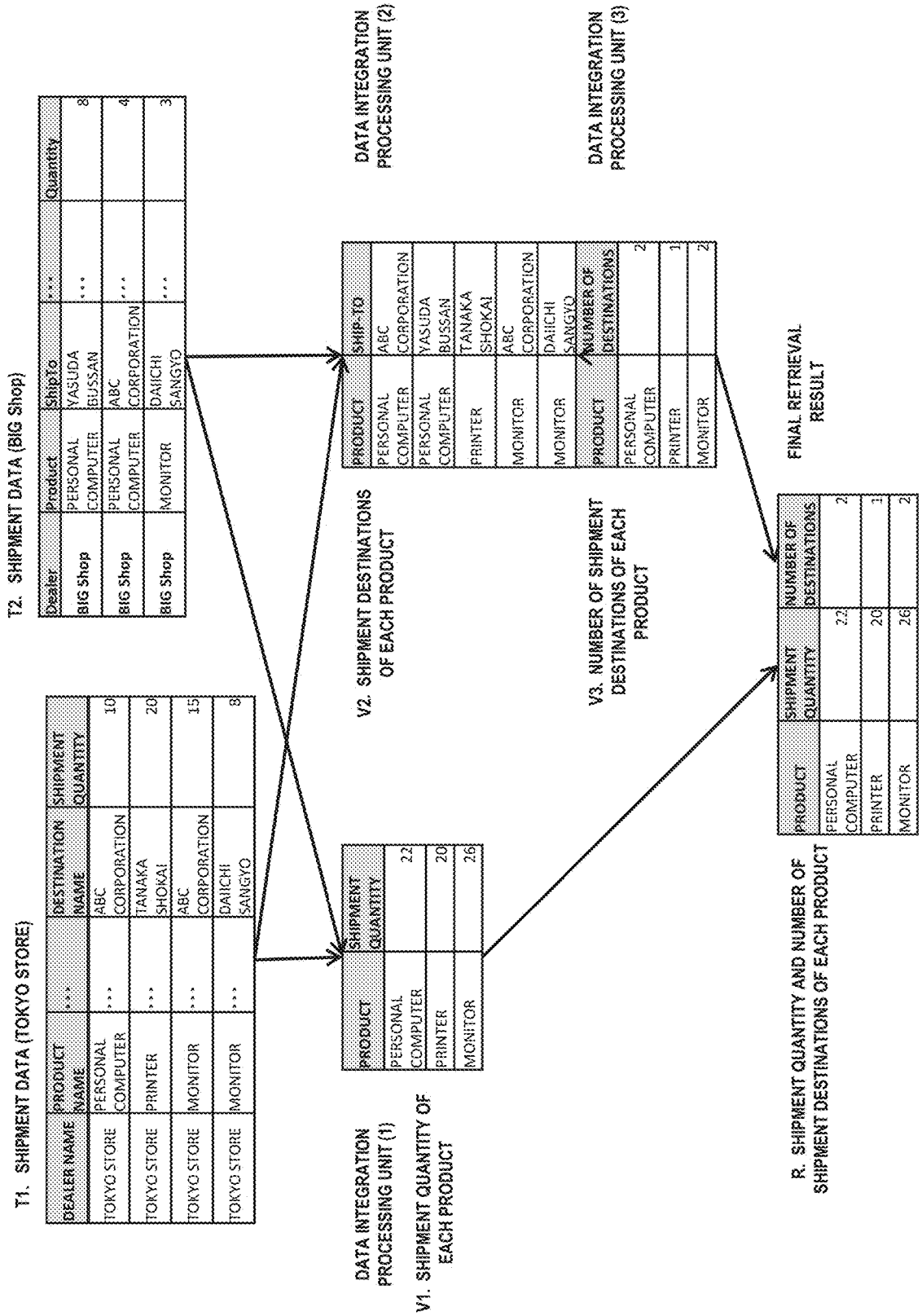

DATA RETRIEVAL APPARATUS, PROGRAM AND RECORDING MEDIUM

CROSS REFERENCES TO RELATED APPLICATIONS

This Application is a continuation application of the pending U.S. patent application Ser. No. 15/506,095, filed on Feb. 23, 2017, which is a U.S. National Stage Application of International Application PCT/JP2015/082316, filed Nov. 17, 2015, which claims priority to Japanese Patent Application No. 2014-234228, filed on Nov. 19, 2014, the contents of which are hereby incorporated by reference in their entireties.

TECHNICAL FIELD

The present invention relates to a data retrieval apparatus that generally retrieves data from a plurality of databases.

BACKGROUND ART

<BI Tool>

Business intelligence (BI) is a technique for a user attempting to freely analyze necessary data by himself/herself from huge quantities of data in a company accumulated from business systems and the like and utilize the analyzed data for decision-making in the company such as management plans and corporate strategies. A BI tool used for such purposes includes an intuitive human interface enabling a user to provide interactive instructions so that even a user who does not have intimate knowledge of systems and programming can use the tool, and allows retrieval and analysis using business terms that are usually used and flexible reporting of retrieval and analysis results in various formats.

<OLAP>

Data analysis with a BI tool is carried out using a technique of multi-dimensional analysis called online analytical processing (OLAP).

In the OLAP, data to be manipulated are handled as a cube having a multi-dimensional data structure defined as a set of multiple data aggregate items (dimensions) and quantitative value items (measures) (CODD: multi-dimensional concept view).

Data are also complete and consistent, which is a prerequisite (CODD: generality of dimension, inter-dimensional calculation process without constraints).

In the OLAP, analysis in a multi-dimensional aspect is, logically, conducted by extracting, typically, two-dimensional data from a multi-dimensional cube for analysis, displaying the extracted data in a form of a table, graph, chart, or the like, switching the display by analytical manipulation such as slicing, dicing, and drill-down/roll-up, and repeating these manipulations.

Slicing

Taking out only specific members of multi-dimensional data at a section, and putting the taken members into a two-dimensional table.

Dicing

Switching between vertical and horizontal items, and putting an entirely different section of the multi-dimensional data into a two-dimensional table.

Drill-Down/Roll-Up

Drill-down refers to manipulation of digging into an aggregate result to display more detailed breakdown data, and roll-up refers to a reverse of the manipulation.

<DWH, DM, ETL>

Typically, in an organization such as a company, multiple business systems are in operation where data are dispersed over various sources, and such data once need to be consolidated for data analysis.

An example of a technique for accumulating data collected from multiple business systems in time series, analyzing a large quantities of data, and making use of the analyzed data for decision making is a data warehouse (DWH). A data mart (DM) is usually smaller than a data warehouse, and collects data necessary for a specific theme or field and supports executives making strategic decisions on business. A retrieval result obtained through retrieval of data accumulated in a data warehouse, a data mart, or the like is reorganized and used as a multi-dimensional and multi-level cube for OLAP analysis.

For storing data occurring in business systems in databases and constructing a data warehouse or a data mart, ETL (extract, transform, and load) processes are required. ETL tools having functions necessary for a process of loading data into databases are often used recently, but this typically results in a complicated process since data are asynchronously supplied from a plurality of different information sources.

CITATION LIST

Patent Literature

Patent Literature 1: JP 3213585 B

SUMMARY OF INVENTION

Technical Problem

The OLAP using a BI tool provides a technique for sophisticated data analysis on the assumption of a single cube having a multi-dimensional data structure.

In the real world, however, it is often difficult to obtain complete and consistent data, and there are also cases where a significant cost is involved for data management or where important information is lost during data management and aggregation.

Example of Inconsistency at Low Granularity
(Detailed Data do not Include Common Key Items)

Description will be made with reference to FIG. 1. Assume, for example, that a "sales amount" is defined for each product and each customer and that a "purchase amount" is defined for each product and each vendor. A "gross profit amount" of a product can be calculate by [(sales amount totaled for each product)−(purchase amount totaled for each product)]. Furthermore, company-wide-level (company-level) "sales amount," "purchase amount," and "gross profit" can be reported (roll-up) by totaling records of each product.

If a user wants to see details by customer from records by product, however, the details by customer cannot be drilled down from the same cube because the "purchase amount" and the "gross profit amount" by customer are not defined at a detail level.

In contrast, individual "sales amounts" can be totaled for each customer and each product, so that the company-level sales amount can be reported, which can be drilled down to details by customer and further to details by customer and product. This is similarly applied to the "purchase amount".

In the case of this example, a value item (measure) "gross profit amount" is defined only at a high granularity (hierarchy level) where "customer" and "vendor" are not included in data aggregate items (dimensions), and "sales amount" is defined at all levels where "vendor" is not included while "purchase amount" is defined at all levels where "customer" is not included.

Thus, if all data of the "sales amount," the "purchase amount," and the "gross profit amount" are to be referred to, one cube for analysis is insufficient for the reference but three cubes need to be provided.

Example of Inconsistency at High Granularity
(Constraints and Limitations of Process for Integration into Aggregated Data)

Description will be made with reference to FIG. 2. For example, in a multinational company, since accounting is conducted in different currencies in different countries, conversion into a reference currency needs to be carried out before totaling for accounting consolidation of a plurality of companies. Since the currency exchange rates change hourly, it is possible to convert the currency at a rate at a certain point and prepare a report or make evaluation on a consolidated basis. In totaling using a reference currency, however, items such as the amount and the currency before conversion are omitted since such items cannot be aggregated.

Furthermore, although the whole can be viewed macroscopically as a result of data integration, a significantly large number of data become invisible as a result of aggregation since legal systems, rules, systems and the like are also different in companies in different countries. Thus, in analysis for the purpose of taking specific actions, individual original data often need to be referred rather than aggregated data on a consolidated basis.

Although data including inconsistency are present everywhere in the real world, approaches for analyzing such data including inconsistency have not been feasible for the reasons described below.

(Limitations of Conventional Data Integration Technique (Single Cube))

With a single cube that is complete and consistent, data at a higher level can be generated by aggregation of data at a lower level, and thus it is sufficient to collect data of relatively small kinds from business systems and hold the collected data in databases. Thus, conventionally, data limited to core data of a company are collected from business systems, shaped (cleansed), and temporarily stored in a data warehouse or a data mart, and a cube is derived therefrom and provided for analysis as a multi-dimensional data model that is as complete and consistent as possible.

For analyzing data including inconsistency, however, a plurality of cubes need to be built by avoiding inconsistent parts and dividing respective data into parts that can be modeled. The number of cubes necessary for this increases exponentially depending on the types of data including inconsistency and the number of items, and becomes an enormous number in theory if an attempt is made to cope with every cases, and it has therefore been deemed to be difficult to cope with such cases.

Owing to such factors as complication and diversification of corporate activities and sophistication of administration, interests in management have expanded from specific problem domains to the whole corporate activities, and any data inside and outside of a company are increasingly likely to be subject of analysis accordingly.

The cost effectiveness of copying data in every business systems in a company and providing the copies as data for analysis, however, is clearly unrealistic in view of the types and amount of data held by a company.

In addition, in view of the time of batch processing required for data duplication for updating a data warehouse while work data change every minute, every day, it is difficult to provide latest data as data for analysis.

Furthermore, in the first place, a considerable amount of engineering work is required for integrating data of multiple business systems operating individually, and the labor for the work rapidly increases as the number of systems to be integrated increases. Only part of the data, however, are actually needed to be integrated and aggregated, and there are many situations where direct analysis of data in business systems is more effective than summarizing such data.

Thus, the conventional data integration technique of duplicating and reconstructing data all together and providing the data as a cube not including inconsistency is becoming less and less suitable for companies' needs requiring more sophisticated and wider analysis in terms of cost, time, and information loss. Such a flexible approach that is based on actual circumstances of users' needs for analysis in which association is made within a range that can be made common for data integration as a whole while original data of business systems are utilized for direct analysis of respective data for details is deemed to be ideal.

(Limitation of OLAP Analysis Based on Single Cube)

In a typical OLAP analysis, data analysis can be efficiently performed on a single cube. In a case where data including inconsistency are analyzed as a plurality of cubes associated with each other, however, although the cubes are closely related to one another, there have been no technique for managing and utilizing the relation, and therefore the cubes can only be handled as totally different cubes.

Thus, even in a case where a cube is referred to while another cube related to the cube is being analyzed, user supports such as inheritance of previous analysis results and guidance of related items are not provided, and processing can only be started from the beginning, from opening another new cube.

(Limitation of Method for Expressing a Plurality of Cubes with Conventional BI Tool)

A BI tool logically builds a multi-dimensional cube for analysis from one piece of data, takes data from the cube to display the data basically in a format of a two-dimensional table, graph or the like, and switches the display by analytical manipulation of slicing, dicing, or drill-down for analysis of multi-dimensional aspects.

In handling data including inconsistency, however, since associated contents of a plurality of data need to be comprehensively recognized, expression only with a simple two-dimensional table or graph is difficult.

For this purpose, a dashboard in which data collected from various information sources are arranged as a plurality of graphical reports on one screen, which allows display of information from various viewpoints all together, for example, is a considerably effective technique. In a dashboard of a conventional BI tool, however, extracted information can be statically arranged and displayed, but the function of performing slicing or drill-down on a plurality of cubes for different data all together at the same time cannot be supported because the relevance between items of different data cannot be defined, and analysis in multi-dimensional aspects of data including inconsistency has been very troublesome.

Furthermore, in transition from a report to another report on different data associated therewith, a unit for defining the relevance between data is not provided, and in addition, there are many cases that do not apply to simple analysis manipulation such as slicing, dicing, and drill-down based on a single cube, and it is very difficult to achieve transition between reports on different data with the conventional BI tool.

An object of the present invention is therefore to provide a data retrieval tool for analyzing data including inconsistency that is difficult to cope with in a single cube in such a case as collecting and analyzing relevant data dispersed over multiple business systems in a company or the like.

Solution to Problem

To achieve the aforementioned object, the present invention basically provides a data retrieval tool configured to:
integrate a function of a virtual database with a function of a BI tool into integral software; and
control the integral software with a single data dictionary capable of managing data associations between a plurality of retrievals,
so as to:
integrate data respectively obtained from a plurality of databases to prepare a retrieval result,
prepare a plurality of reports from a plurality of retrieval results depending on uses and purposes, and
automatically associate and manipulate the prepared reports.

<Virtual Database Function of Integrating Data from a Plurality of Databases>

In the conventional technique, a plurality of dispersed related data are duplicated and stored in a data warehouse or the like, and a cube for analysis is derived therefrom. With the conventional technique, however, in a case where data including inconsistency are to be analyzed, the types and amount of data to be accumulated will be enormous since cubes for analysis are different depending on situations and patterns.

In contrast, with a virtual database (also called an enterprise information integration (EII) or a Federated database system), a user can perform retrieval from a plurality of databases by a single inquiry without moving or duplicating dispersed data. A virtual database is a logical database only having various definitions and rules, and actual data are virtually generated in real time at the time of execution from only necessary data.

Thus, a virtual database is flexible since wasteful data duplication is not necessary, is likely to cope with an increase in the volume of work data and an increase in the number of databases, and enables data integration over a plurality of data warehouses and data marts and data integration with external data. In addition, the cost for a server or a database for storing duplicated data is not needed, and operational and maintenance costs for data management, data quality maintenance, system repair and modification can be reduced. Furthermore, a virtual database has advantages in that data reconstruction work like that of a DWH is not needed and no time lag for data generation is caused, which allows acquisition of recent data in real time and preparation of reports reflecting latest business conditions.

Use of the virtual database function allows acquisition of data required each time and provision of data in a pseudo multi-dimensional data model data for analysis without copying and accumulating data from business systems and the like and permanently holding such data.

<Data Dictionary Function of Associating a Plurality of Prepared Reports>

The data dictionary includes virtual data structure definition information, presentation structure definition information, and retrieval request definition information. The virtual data structure definition information flexibly defines a data structure from a viewpoint unique to a user depending on uses and purposes and completely independent of the physical data structure, in addition to the definition information of the physical data structure such as tables and items stored in a plurality of databases from which data are to be retrieved, and includes definition for converting data having the physical data structure into data having a requested data structure by integrating and editing the data. The presentation structure definition information includes definition for assisting user's input to issue a retrieval request compliant with retrieval requirements. Furthermore, the retrieval request definition information is for managing the relevance between different retrieval requests.

As a result of defining the relevance between different retrieval requests and including definition information of globally identifiable data items and definition information of compounded or hierarchical data items, the data dictionary enables management of the commonality and the relevance of data items and data levels between a plurality of retrieval results acquired by a retrieval request issued on the basis of the virtual data structure or a plurality of reports prepared from retrieval results.

<BI Function of Associating and Manipulating a Plurality of Reports>

A typical BI tool has a function of handling a single report such as irregular retrieval, regular retrieval, and report referencing, and is capable of moving to a related report by data analysis manipulation of slicing, dicing, and drill-down within a range where a single retrieval result is to be obtained.

In addition, according to the present invention, since the relevance between a plurality of retrieval requests can be managed by a data dictionary, the function of a virtual database and the function of a BI tool are integrated, allowing data including inconsistency to be handled. Thus, the present invention has a function of retrieval link capable of also associating reports from different retrieval results with each other, which achieves movement to an associated report while inheriting extraction conditions and selections of the current report to the associated report.

In addition, the present invention achieves a function of performing data analysis manipulations on a plurality of reports referring to different retrieval results all together even in a dashboard in which a plurality of reports are arranged on one screen.

Specifically, a data retrieval apparatus according to the present invention has the following features.

A first aspect of the present invention is a data retrieval apparatus that retrieves data from two or more databases (1) that return retrieved data in response to a retrieval instruction.

The data retrieval apparatus includes: a data dictionary (10) including presentation structure definition information for assisting input of a user terminal (2) to issue a retrieval request compliant with a retrieval requirement, virtual data structure definition information for analyzing the retrieval request and converting the retrieval request into a retrieval instruction expressed as physical information processable by the database (1), and retrieval request definition information for managing relevance between different retrieval requests; a business intelligence unit (30) for assisting input of the user terminal (2) according to the presentation structure defined in the data dictionary (10) to issue a retrieval request described according to the presentation structure and output a retrieval result based on the virtual data structure, the retrieval result being obtained by executing the retrieval request by a virtual database unit (20) to the user terminal (2); and a virtual database unit (20) for analyzing the retrieval request according to the virtual data structure defined in the data dictionary (10) to generate a retrieval instruction, executing the generated retrieval instruction in the database (1) to acquire two or more retrieved data, and integrating the acquired two or more retrieved data to prepare a retrieval result responding to the retrieval request, wherein a plurality of retrieval results prepared in response to different retrieval requests can be associated with each other by the retrieval request definition information.

More specifically, the data dictionary (10) preferably includes physical data structure definition information on the database (1) that returns retrieved data in response to a retrieval instruction, virtual data structure definition information for writing a retrieval request compliant with retrieval requirements, converting the retrieval request into a retrieval instruction expressed in a physical data structure that can be processed in the database (1) and preparing a retrieval result responding to the retrieval request on the basis of retrieved data acquired from the database (1), and presentation structure definition information for assisting input of the user terminal (2) to issue a retrieval request compliant with retrieval requirements and outputting the retrieval result to the user terminal (2), and the presentation structure definition information preferably has retrieval request definition information for managing relevance between different retrieval requests.

The virtual database unit (20) and the business intelligence unit (30) preferably perform control on the basis of retrieval request definition information that manages the relevance between different retrieval requests contained in the data dictionary (10).

Specifically, when the virtual database unit (20) has prepared a plurality of retrieval results in response to different retrieval requests associated by the retrieval request definition information, the virtual database unit (20) automatically associates the prepared retrieval results with each other, and the business intelligence unit (30) preferably prepares a plurality of reports respectively from the retrieval results associated by the virtual database unit (20), and automatically associates the prepared reports with each other.

The business intelligence unit (30) preferably includes: a retrieval request issuing unit (31) that assists the user terminal (2) according to the presentation structure in the data dictionary (10) to issue a retrieval request based on the presentation structure to the virtual database unit (20); and a report output unit (32) that prepares a report from the retrieval result acquired from the virtual database unit (20), and sends the report to the user terminal (2).

The business intelligence unit (30) is preferably configured to display a plurality of reports prepared from a plurality of retrieval results acquired by executing a plurality of retrieval requests sequentially or simultaneously; and associate and manipulate a plurality of reports with each other by the retrieval request definition information that manages relevance between different retrieval requests contained in the data dictionary (10).

The business intelligence unit (30) is preferably configured to: associate a first retrieval request with a second retrieval request as relevant retrieval; and execute the first retrieval request to display a first retrieval result in the user terminal (2), and select data contained in the first retrieval result and instruct a link to the second retrieval request, so as to: inherit an item and a condition value of an extraction condition contained in the first retrieval request and an item and a display value associated with data selected from the first retrieval result to the second retrieval request; and when an associated item associated with the item inherited from the first retrieval request is present in an extraction condition of the second retrieval request, replace a condition value of the associated item with the condition value inherited from the first retrieval request, execute the second retrieval request, and display a second retrieval result.

The business intelligence unit (30) is preferably configured to: prepare a dashboard including a plurality of reports output from a plurality of retrieval results, the reports being arranged on one screen; when data contained in a retrieval result of one of the reports within the dashboard are selected, inherit an index item and a display value associated with the selected data to another report within the dashboard; and when an item associated with the index item inherited to an extraction condition of a retrieval request of the another report is present, replace a condition value of the extraction condition with a display value to which the condition value is inherited, execute a retrieval request to display a new retrieval result, so as to manipulate a plurality of reports within the dashboard in conjunction with each other.

The report output unit (32) of the business intelligence unit (30) is preferably configured to: perform aggregation operation on a combination of index items with same aggregation level all together when a retrieval request contains a plurality of classifiable index items (dimensions) and one or more aggregable value items (measures). When two or more aggregation levels for assigning orders to the index items are set, in displaying a retrieval result at a certain aggregation level on the user terminal (2), the report output unit (32) preferably displays only values of index items at a level higher than the certain aggregation level, and displays an aggregation value obtained by aggregation of only index items at a level higher than the certain aggregation level in the value items; and when the user terminal (2) has selected specific data in the retrieval result at the certain aggregation level, displays detailed records at an aggregation level lower by one level having an index item equal to the displayed index item of the selected specific data on the user terminal (2).

The business intelligence unit (30) preferably has a library management unit (33) capable of saving a retrieval request once prepared by the user terminal (2) and reading the retrieval request for reuse, and the business intelligence unit (30) preferably sets a user terminal (2) capable of using the library management unit (33) according to user authority to allow the retrieval request to be shared depending on a purpose of use.

The business intelligence unit (30) preferably includes a retrieval history management unit (34) capable of saving a retrieval result responding to a retrieval request for a predetermined period or for a predetermined number of history records specified by the user terminal (2), and when the user terminal (2) has specified a retrieval request from a library, a list of retrieval results responding to the retrieval request is displayed, and a retrieval result is specified from the list, so that the retrieval result can be directly referred to.

The retrieval request issuing unit (31) is, preferably, capable of handling a set item expressing a plurality of associated items by one concept, when the set item is specified in an extraction condition of a retrieval request, the retrieval request issuing unit (31) is, preferably, capable of setting a condition value while referring to values of the associated items, and the associated items are, preferably, automatically added to a display item of a retrieval result by an input operation of the user terminal (2) to add the set item to the display item of the retrieval result.

The set item of the retrieval request issuing unit (31) is preferably constituted by one or more items in hierarchical relation with each other, when a value is selected from a list of items at an upper level on a screen of the user terminal (2), a list of values of items at a lower level associated with the selected value is preferably displayed, and the user terminal (2) is preferably capable of specifying a value to be an extraction condition for retrieval from the values displayed on the list of any level.

The virtual database unit (20) preferably includes a retrieval request translation unit (21) that analyzes the retrieval request described according to the virtual data structure and generates one or more retrieval instructions for retrieval from the databases (1); a retrieval instruction execution unit (22) that executes the retrieval instruction generated by the retrieval request translation unit (21) on any one or more of the databases (1) to acquire one or more retrieved data; and a data integration processing unit (23) that integrates and processes the retrieved data acquired by the retrieval instruction execution unit (22) to prepare a retrieval result responding to a data retrieval request.

The retrieval request translation unit (21) is preferably configured to: analyze the retrieval request according to the virtual data structure in the data dictionary (10); generate a retrieval instruction executable on a database to retrieve data from and one or more retrieval instructions executable by the data integration processing unit (23); and input an output of a retrieval instruction from a data integration processing unit (23) as a retrieval instruction to another data integration processing unit (23), so as to generate retrieval instruction to perform data integration processing in multiple stages.

The retrieval request translation unit (21) is preferably configured to: convert and apply an extraction condition for the virtual database unit (20) indicated in a retrieval request into a retrieval instruction to the database (1); execute classification and totaling requested in a retrieval request in advance in the database (1); and performing processing of referring to a master managing a subject static attribute at a stage after data have been aggregated without performing the processing during retrieval of detailed data, so as to optimize the retrieval instruction to minimize a data amount transmitted from the database (1).

When the database supports an SQL language as a retrieval interface, the retrieval instruction execution unit (22) preferably includes at least one of: a retrieval instruction execution unit for retrieval using the SQL from a physical table of the database; a retrieval instruction execution unit for retrieval using a stored procedure stored in the database; and a retrieval instruction execution unit that performs retrieval again from a retrieval result of retrieval defined directly by the SQL language of the database, when the database does not support the SQL language as a retrieval interface, the retrieval instruction execution unit preferably includes a retrieval instruction execution unit corresponding to a retrieval interface of the database, and when the database is a data file on a file system, the retrieval instruction execution unit preferably includes a retrieval instruction execution unit supporting for the data file.

The data integration processing unit (23) is preferably capable of receiving as input one or more of intermediate retrieved data acquired by the retrieval instruction execution unit (22) or result data output by another data integration processing unit (23), performing data integration and data processing, and outputting result data in a form of one table, and further passing the result data as input to another data integration processing unit (23), so as to perform data integration processing in multiple stages.

The data integration processing unit (23) preferably includes any one or more data integration schemes including: a merge scheme of merging intermediate data obtained by extracting and totaling data from the respective databases and then aggregating the merged data with a key; a selection scheme of automatically selecting, extracting, and totaling data to be retrieved from retrieval candidates in a plurality of databases according to a content of a retrieval request; and a reference scheme of acquiring reference data from one database according to a reference condition predefined for each of records of intermediate data acquired from another database, and complimenting an item missing from the intermediate data with an item from the reference data, and the data integration processing unit (23) is preferably capable of selecting an optimum scheme from the data integration schemes.

The reference scheme of the data integration schemes of the data integration processing unit (23) preferably includes one or more data integration schemes including: a successive reference scheme of performing sequential retrieval from a database for respective records of intermediate data obtained by extraction and totaling from another database according to a join condition, and integrating retrieved data; a batch join scheme of transferring intermediate data extracted and totaled from one database to one database management system, and integrating the transferred intermediate data together or integrating the intermediate data and data in the database management system by a join function of the database management system; and a sequential merge scheme of acquiring data to be retrieved from a reference source and data to be retrieved from a referenced database, rearranging the acquired data in an order of condition values of reference conditions, and thereafter, while sequentially reading reference source records and referenced database records one by one, comparing the condition values of the reference conditions, and integrate records where the reference conditions are satisfied, and the data integration processing unit (23) is preferably capable of selecting an optimum scheme from the data integration schemes.

The data integration processing unit (23) preferably has functions of a classification and aggregation process of grouping data by a key item and aggregating values of attribute items for each group, a data editing process on values of items, a data extraction process according to a determination condition, and a sorting process according to specification of an outputting order, and the data integration processing unit (23) is preferably capable of dealing with computation dependent on relation between records and an order of records.

The data integration processing unit (23) is preferably capable of outputting result data resulting from data integration and data processing to any of external output destinations including: the business intelligence unit (30); another data integration processing unit (23); a table in a database; a data filed stored in a file system; and a data stream transmitted via a network.

The data integration processing unit (23) preferably includes a retrieved data cache that prepares in advance table data resulting from a data integration process or intermediate retrieved data prepared by division resulting from execution of a retrieval instruction, storing the prepared data in an external storage area, and referring to data stored in the external storage area instead of a database during execution of retrieval.

The database (1) preferably includes at least one of a relational database, an object-oriented database, an XML database, a file system, a URL directory management system, a data warehouse, and a data mart.

A second aspect of the present invention is a program causing a computer to function as a data retrieval apparatus that retrieves data from two or more databases (1) that return retrieved data in response to a retrieval instruction.

The program causes the computer to function as the data retrieval apparatus including: a data dictionary (10) including presentation structure definition information for assisting input of a user terminal (2) to issue a retrieval request compliant with a retrieval requirement, virtual data structure definition information for analyzing the retrieval request and converting the retrieval request into a retrieval instruction expressed as physical information processable by the database (1), and retrieval request definition information for managing relevance between different retrieval requests; a business intelligence unit (30) for assisting input of the user terminal (2) according to the presentation structure defined in the data dictionary (10) to issue a retrieval request described according to the presentation structure and output a retrieval result based on the virtual data structure, the retrieval result being obtained by executing the retrieval request by a virtual database unit (20) to the user terminal (2); and a virtual database unit (20) for analyzing the retrieval request according to the virtual data structure defined in the data dictionary (10) to generate a retrieval instruction, executing the generated retrieval instruction in the database (1) to acquire two or more retrieved data, and integrating the acquired two or more retrieved data to prepare a retrieval result responding to the retrieval request, wherein a plurality of retrieval results prepared in response to different retrieval requests can be associated with each other by the retrieval request definition information.

A third aspect of the present invention is a computer-readable recording medium having the program stored thereon.

Advantageous Effects of Invention

The present invention is provided with a data dictionary capable of managing relevance between a plurality of retrieval requests and integrates a virtual database and a BI tool as integral software, and thus exhibits a function of directly acquiring data from a plurality of databases, a function of associating and preparing a plurality of retrieval results depending on uses and purposes, and a function of associating and manipulating a plurality of reports from a plurality of retrieval results. Thus, according to the present invention, analysis of data including consistency, which is difficult to cope with by a single cube becomes easier. As a result, from the viewpoint of users, since a virtual data structure can be flexibly prepared according to the uses and purposes of the users, highly flexible and fine analysis where a whole is analyzed after data integration through association while details are analyzed by direct analysis of data in respective business systems can be readily achieved.

As described above, the present invention is characterized in including both the functions of a BI tool and the functions of a virtual database and in that the respective functions are driven by a common data dictionary. As a result of using common data structure definition for a data structure definition for retrieval by a BI tool and a data structure definition provided by a virtual database, the provision function of the virtual database naturally satisfies necessary and sufficient retrieval requirements of the BI tool, which significantly makes analysis and design processes simpler. In addition, while it is difficult through requirement analysis by the BI to properly recognize users' needs in advance and addition and modification of requirements often occur during construction or even after completion, the integrated management of the data structure definitions of the BI tool and the virtual database with the data dictionary clarifies the range of influence of the addition and modification of user requirements and also significantly increases the efficiency of system maintenance process.

Furthermore, since a common data analysis unit can be used from top management analysis of an organization to analysis of individual work on sites, information sharing and smooth communication are enhanced in an organization.

Furthermore, in terms of systems, it is no longer needed to copy a large amount of data collectively in multiple business systems within a company and reconstruct and store the copy in a data warehouse or the like for data analysis. Since analysis data become readily available only by defining a virtual data structure in a data dictionary, development can be achieved in a very short term and at a very low cost.

Furthermore, since data of the entire company can be systematically managed in an integrated manner, there is also an advantage of increasing the efficiency of access management and quality management relating to data.

BRIEF DESCRIPTION OF DRAWINGS

FIG. 1 illustrates an example of inconsistency at low granularity.

FIG. 2 illustrates an example of inconsistency at high granularity.

FIG. 3 illustrates an overall configuration of a system.

FIG. 4 illustrates a concept a process for analyzing data including inconsistency.

FIG. 5 illustrates an outline of a data structure of a data dictionary.

FIG. 6 illustrates functional blocks of a business intelligence unit.

FIG. 7 illustrates an example of a screen for issuing a retrieval request.

FIG. 8 illustrates an example of a screen for library management.

FIG. 9 illustrates an example of screen operation of a retrieval link.

FIG. 10 illustrates a flowchart of a process for inheritance of extraction conditions and selections through a retrieval link.

FIG. 11 illustrates an example of a screen for setting extraction condition linking between a plurality of reports in a dashboard.

FIG. 12 illustrates an example of manipulation of a screen for setting an extraction condition in a class virtual item.

FIG. 13 illustrates functional blocks of a virtual database unit.

FIG. 14 illustrates concepts of processing in a plurality of data integration schemes.

FIG. 15A illustrates concepts of processing in a successive reference scheme and a batch join scheme.

FIG. 15B illustrates a concept of processing in a sequential matching scheme.

FIG. 16 illustrates a concept of processing in a sequential merge scheme.

FIG. 17 illustrates a flowchart of processing in the sequential merge scheme.

FIG. 18 illustrates a concept of processing of a data cache.

FIG. 19 illustrates a concept of processing of multi-stage data integration processing unit.

DESCRIPTION OF EMBODIMENTS

An embodiment of the present invention will now be described with reference to the drawings. The present invention is not limited to the embodiment described below but includes modifications within a scope obvious from the embodiments below to a person skilled in the art as appropriate.

<Configuration Diagram of Overall System>

FIG. 3 illustrates an overall configuration of a data retrieval apparatus according to an embodiment of the present invention. A data retrieval apparatus 100 is a data retrieval apparatus that uses two or more databases 1, which return retrieved data in response to a retrieval instruction, as data sources. The data retrieval apparatus 100 is connected to two or more external databases 1, one or more external user terminals 2, and one or more external administrator terminals 3. Furthermore, the data retrieval apparatus 100 includes a data dictionary 10, a virtual database unit 20, and a business intelligence unit 30. The data retrieval apparatus 100 can also include a data dictionary editing unit 40 connected to an external administrator terminal 2.

Cases where two or more databases are connected as databases 1 include not only a case where two or more physically separate databases are used but also a case where physically one database is logically divided into two or more databases for such a reason as different types of data are contained.

<Conceptual Diagram of Process for Analyzing Data Including Inconsistency>

FIG. 4 is a conceptual diagram of a process for analyzing data including inconsistency that are difficult to cope with, with a single cube performed with use of the data retrieval apparatus 100.

In the example illustrated in FIG. 4, a retrieval request 1 and a retrieval request 2 are different in subjects (such as databases) from which data are to be retrieved. The retrieval request 1 and the retrieval request 2, however, are associated with each other in the content to be retrieved. The retrieval request 1 and the retrieval request 2 are thus associated as relevant retrieval on the basis of definitions of relevance between retrieval requests to the data dictionary 10 (retrieval request definition information). The association between retrieval requests can be freely made by a user using a retrieval request entry screen or the like.

As a result of associating the retrieval request 1 and the retrieval request 2 with each other in this manner in the data dictionary 10, a report 1 prepared from a retrieval result 1 obtained by execution of the retrieval request 1 and a report 2 prepared from a retrieval result 2 obtained by execution of the retrieval request 2 can be associated with each other on the basis of the relevance between the retrieval requests. This achieves a retrieval link function of moving to an associated report while inheriting extraction conditions and selections of a current report to the associated report. Since a plurality of retrieval results prepared from different retrieval requests are associated in this manner and it is possible to readily move between reports even between different retrieval results, data including consistency that are difficult to cope with by a single cube can be efficiently analyzed.

Specifically, a user first sets extraction conditions, a way of output and the like depending on uses and purposes through a retrieval request entry screen of the business intelligence unit 30, and issues a retrieval request 1 to the virtual database unit 20. The virtual database unit 20 issues retrieval instructions to some of a plurality of databases 1 to execute retrievals on the basis of the received retrieval request 1, and integrates two or more retrieved data obtained by the respective retrievals to prepare a retrieval result 1. The business intelligence unit 30 builds a multi-dimensional cube for analysis from the prepared retrieval result 1, and displays one section of the cube as a report 1. An OLAP analysis operation of slicing, dicing, or drill-down can be instructed on the displayed report 1, so that the display of the cube of the retrieval result 1 can be switched to another section.

Furthermore, the business intelligence unit 30 provides a retrieval link function for calling a retrieval request 2 from the report 1 prepared on the basis of the retrieval request 1, on the basis of definition of relevance between the retrieval request 1 and the retrieval request 2 in the data dictionary 10. In calling the retrieval request 2 from the report 1, items and condition values of the extraction condition contained in the retrieval request 1 and items and display values associated with data selected with a mouse or a keyboard by a user for the displayed report 1 are inherited to the retrieval request 2. If an associated item associated with an item inherited from the retrieval request 1 is present in the extraction condition of the retrieval request 2, the condition values of the associated item are replaced with the condition values inherited from the retrieval request 1 before the retrieval request 2 is issued. In this manner, the business intelligence unit 30 issues the retrieval request 2 to the virtual database 20. The virtual database unit 20 then executes the retrieval request 2 to prepare a retrieval result 2, and passes the retrieval result 2 to the business intelligence unit 30. The business intelligence unit 30 builds a multi-dimensional cube for analysis from the retrieval result 2, and displays one section of the cube as a report 2. As a result, data associated with those selected by the user in the report 1 can be automatically retrieved from a different viewpoint with the retrieval request 2 and displayed as the report 2. An OLAP analysis operation of slicing, dicing, or drill-down can be instructed on the displayed report 2, similarly to the report 1 described above, so that the display of the cube of the retrieval result 2 can be switched to another section.

Note that the movement from the report 1 to the report 2 can be automatically carried out without human intervention. Thus, as a result of defining the relevance between the retrieval request 1 and the retrieval request 2 by the data dictionary 10, the report 1 prepared from the retrieval result 1 obtained by executing the retrieval request 1 and the report 2 prepared from the retrieval result 2 obtained by executing the retrieval request 2 can be associated with each other, and it is possible to readily move between reports even between different retrieval results.

In addition, in a dashboard where a plurality of reports prepared from different retrieval requests are arranged on one screen, reports can similarly be associated on the basis of definition of the relevance between retrieval requests. On the basis of the association between reports, an OLAP analysis operation of slicing, dicing, or drilling-down a plurality of reports prepared from different data arranged in a dashboard can be achieved.

<Data Structure of Data Dictionary>

FIG. 5 is a class diagram expressing an outline of a data structure of the data dictionary 10.

The data dictionary 10 is constituted by three levels including physical data structure definition information, virtual data structure definition information, and presentation structure definition information. The physical data structure definition information is connected with each of a plurality of databases 1 from which data are to be retrieved, and defines a physical data structure including tables and items necessary for data retrieval. The virtual data structure definition information is completely independent of the physical data structure, flexibly defines a data structure from a viewpoint of data usage depending on uses and purposes, and defines a virtual data structure including a definition for converting physical data into a requested data structure. The presentation structure definition information defines a presentation structure for assisting user's input to issue a retrieval request compliant with retrieval requirements.

The physical data structure definition information is basically the same as a database or a copy of a necessary part from a database. The virtual data structure definition information is usually built by a system administrator having knowledge of databases depending on the needs of data use. In contrast, the presentation structure definition information may be able to be added or updated by a user as necessary depending on the authority and the role of the user.

(Physical Data Structure)

The data dictionary 10 is connected to external databases from which data are to be retrieved via the virtual database unit 20, and defines information necessary for data retrieval as a physical data structure. The number of databases to be connected to is preferably two or more. Cases where the number of databases is two or more include not only a case where two or more physically separate databases are used but also a case where a database is logically divided into two or more databases for such a reason as different types of data are contained.

The physical data structure definition information is constituted by definition information of a "physical database" that is a definition of a database from which data are to be retrieved, a "physical table" included in the physical database, and a "physical item" contained in the physical table.

The definition information of "physical database" is definition information defining information unique to the database such as procedures for connecting to the database, data types that the database can handle, the types of functions provided in the database. When data are to be retrieved from a plurality of databases, a plurality of "physical databases" are defined.

The definition information of "physical table" is the same definition information as the definition of a table stored in the database or a copy of a necessary part from the table.

The definition of "physical item" is the same definition information as the definition of items (fields) contained in a physical table in the database or a copy of a necessary part from the items.

(Virtual Data Structure)

In the data dictionary 10, the virtual data structure defines a data structure as viewed from a viewpoint of a user or business. The virtual data structure definition information basically includes definition information of a "virtual database," which is the entire virtual data structure, a "virtual table" included in the virtual database, and a "virtual item" contained in the virtual table.

In a case where a plurality of independent users or businesses to be subjects is present definition information of a plurality of "virtual databases" may be defined.

The definition information of "virtual table" is a set of virtual items capable of generating a logically complete and consistent multi-dimensional data model. Virtual items contained in one virtual table can be freely combined to define a retrieval, and prepare a cube from acquired data.

The definition information of "virtual item" defines an attribute such as a feature or a property of an entity representing what can be specifically identified as a subject to be recognized in work and systems (for example, "customer," "product," "purchase order," "sales amount," etc.). The definition information of "virtual item" includes a definition for integrating a plurality of physical items having different item names into logically one virtual item. Specifically, a plurality of physical items having different item names are physically treated as different items. Even a plurality of physical items having different item names may be, however, logically the same item. Thus, association between a plurality of physical items having different item names is defined in the definition information of "virtual item," so that these physical items can be treated as the same virtual item.

Furthermore, the virtual data structure preferably has definition information of "virtual table item" indicating association of "virtual item" with "virtual table". In the present embodiment, a virtual item subordinate to a virtual table is not directly defined. In other words, in the present embodiment, a virtual item is defined independently of a virtual table in a virtual database so that virtual items are associated between different virtual tables, and association of a virtual item with a virtual table is associated as "virtual table item". Thus, the same virtual item is assigned to logically the same items in different virtual tables.

As a result of providing the definition information of "virtual table item" in this manner, whether or not items in different virtual tables are the same virtual item can be determined, which ensures that items that are the same virtual item have common attributes. Thus, reference to the virtual table item enables inheritance of extraction conditions and selection conditions even between retrieval results prepared by retrieval from different virtual tables.

Note that, in the present embodiment, the determination on whether items are the same item in different virtual tables in the same virtual database is made on the basis of a constraint that the name of a virtual item is unique within a virtual database. The determination on whether items are the same item, however, can be made in other manners. In addition, if the names of virtual items, which are different in different virtual tables" are to be displayed, virtual table items can be given different names in different virtual tables.

Furthermore, in the present embodiment, determination on whether items in different virtual databases are the same item is made in such a manner that virtual items are defined for each virtual table in advance, and definition information on the same virtual items in different virtual tables is added to the respective virtual items thereafter.

The definition information of "virtual table item" included in "virtual table" is classified as an item treated as a data aggregate item (dimension) in a cube or an item treated as a value item (measure) in a cube.

Furthermore, the definition information of "virtual table item" can define one virtual item (class virtual item) as a set of a plurality of associated virtual items so as to express an entity having a plurality of attributes, in addition to an ordinary, simple data type such as a character type, a numeric type, and a date type. In particular, a hierarchical class virtual item can be defined for a set of a plurality of virtual items that are hierarchically associated with each other.

Furthermore, the virtual data structure definition information includes definition information necessary for converting data stored in a plurality of databases having the physical data structure into virtual data having the virtual data structure by using a function of the virtual database. The virtual data structure therefor includes definition information of "calculation table," "calculation item," "physical table join definition," and "calculation table application definition," for example.

The definition information of "calculation table" is constituted by definition information of "external calculation table" that directly retrieves data from an external database and definition information of "internal calculation table" that directly retrieves data from other calculation tables including an external calculation table.

At most one piece of definition information of "calculation item" is defined for each of virtual items in each calculation table. In a case where no calculation item is defined for a virtual item in a calculation table, the virtual item cannot be calculated by the calculation table.

(External Calculation Table)

The definition information of "external calculation table" is definition information on a set of calculation items capable of being calculated at the same time from a database, and an external calculation table is associated with one database.

In a case where a database supports the SQL language as a retrieval interface, the definition information of "external calculation table" includes any of a retrieval section for retrieval using the SQL from a physical table of the database, a retrieval section using a stored procedure stored in the database, or a retrieval section (internal view) that retrieves a retrieval result again from a retrieval result of retrieval defined directly by the SQL language of the database. In a case where a database does not support the SQL language as a retrieval interface, the external calculation table includes a retrieval section corresponding to a retrieval interface of the database. In a case where a database is a data file on a file system, the external calculation table can also include an execution unit that executes a retrieval instruction for the data file.

In addition, the definition information of "external calculation table" defines mutual join conditions of a plurality of physical tables by "physical table join definition," so that a plurality of physical tables contained in the database are subject of retrieval. The "physical table join definition" is expressed as a tree structure in which a physical table used as a reference by default in an external calculation table is the uppermost-level root and physical tables joined and referred to in a complementary manner are lower-level child, or a network structure. Specifically, this definition information automatically adds necessary join conditions between physical tables during generation of a database retrieval instruction.

A calculation item of the external calculation table includes a physical item of a physical table defined to be joined, and definition information such as a calculation definition formula and a selection condition formula described with a grammar unique to the database, and the like. The calculation item of the external calculation table is used to automatically add a method for calculating the calculation item during generation of a database retrieval instruction.

(Internal Calculation Table)

The definition information of "internal calculation table" can define data integration processing of receiving outputs from one or more other calculation tables including an external calculation table as inputs, integrating the inputs into one processing result, and outputting the processing result. In addition, a calculation item of the internal calculation table can define an instruction relating to data processing such as item editing, classification and aggregation, and rearrangement.

(Calculation Table Application Definition)

The "calculation table application definition" is definition information of the relation of a calculation table applicable to a specific virtual table during retrieval. In the present embodiment, the "calculation table application definition" is expressed as a tree structure in which one internal calculation table corresponding to a virtual table is the uppermost-level root and one or more external calculation tables are terminal leaves, or can alternatively be expressed as a network structure.

One or more calculation tables can be arranged under one internal calculation table, and outputs of the calculation tables at the lower level are input to the internal calculation table at the upper level. A method for integrating outputs from a plurality of calculation tables at the lower level by the internal calculation table at the upper level can be included in the calculation table application definition. In the present embodiment, a merge scheme, a selection scheme, a reference scheme, or any combination thereof can be specified.

The calculation table application definition has, in a most simple configuration, one internal calculation table at an upper level and one external calculation table at a lower level. In a more complicated case, the calculation table application definition has internal calculation tables at a plurality of upper levels and a plurality of external calculation tables at the lowermost level.

Alternatively, the calculation table application definition can be expressed as a network structure. In this case, the internal calculation table receives outputs from one or more other calculation tables as inputs, integrates the inputs, and outputs one or more processing results classified depending on conditions.

(Presentation Structure)

In the data dictionary 10, the presentation structure can include definition for assisting user's input to issue a retrieval request compliant with retrieval requirements, and definition for outputting a retrieval result to the user.

The definition information of "retrieval request" includes definition information of "retrieval table" indicating a virtual table that is a subject of retrieval, "extraction condition" indicating a data retrieval range in the virtual table, and "display item" indicating a virtual item for which data are to be acquired as a retrieval result. In a case where a retrieval result obtained by executing a retrieval request on a virtual database is present, "retrieval history" such as date and time of retrieval, a person executing retrieval, the condition of retrieval, the condition of report output and data of the "retrieval result" are managed in the presentation structure.

In addition, the definition information of "retrieval request" includes definition information for managing the relevance between retrieval requests. Specifically, the definition information of "retrieval request" defines that a plurality of retrieval requests that are different in databases from which data are to be retrieved or different in conditions for extracting data from databases have relevance with each other. Thus, the definition information of "retrieval request" can include setting of "retrieval link" associating reports on different retrieval results with each other. In the "retrieval link," association of retrieval requests for different retrieval results is made by assigning common "virtual item" to "extraction condition" or "display item" of different retrieval results.

The presentation structure can include "dashboard". A dashboard is a function for displaying one or more reports from various viewpoints needed by a user all together, and includes retrieval requests of the respective reports and definition of an output method, arrangement, and the like of the reports of retrieval results according to the retrieval requests. When extraction conditions in a plurality of reports in a dashboard are for a common "virtual item," the extraction conditions can be designated all together as "dashboard extraction conditions". As a result, a plurality of reports referring to different retrieval results in a dashboard can be subjected to data analysis manipulation all together.

The presentation structure further includes "library". A library retains a template or a dashboard of report retrieval requests prepared by a user. User authority to refer to and edit a library can be limited, so that a retrieval template or a dashboard of reports can be shared by authorized users.

<Configuration of Business Intelligence Unit>

FIG. 6 illustrates a functional block diagram of the business intelligence unit 30 in the present embodiment. As illustrated in FIG. 6, the business intelligence unit 30 includes a retrieval request issuing unit 31, a report output unit 32, a library management unit 33, a retrieval history management unit 34, a retrieval link unit 35, a dashboard display unit 36, and a dashboard linking unit 37, for example.

A plurality of use patterns of the operation of the business intelligence unit 30 can be assumed depending on the role and the purpose of a user. For example, in free retrieval for power users or administrative staffs, the functions of the retrieval request issuing unit 31 are used to freely set output items, output formats, condition items, and the like to issue a retrieval request and freely prepare a report on desired data. In addition, in fixed retrieval for general users and business managers, a retrieval template in which output items, output formats, condition items, and the like are fixedly set is called from the library management unit 33 or the like, only values of conditions are changed to issue a retrieval request and prepare a standardized report. Furthermore, for referring to a report, a retrieval result previously retrieved by the user or other users is called from a list or the like by the retrieval history management unit 34 for viewing. In this case, the function of the retrieval request issuing unit 31 need not be used directly.

(Retrieval Request Issuing Unit)

An image of a screen when the retrieval request issuing unit 31 functions is illustrated in FIG. 7. The retrieval request issuing unit 31 can assist a user terminal 2 to input on the basis of the presentation structure definition information registered in the data dictionary 10, to issue a retrieval request compliant with retrieval requirements input by the user terminal 2. The retrieval request issuing unit 31 has a "retrieval object selecting function," an "extraction condition setting function," a "display item setting function," and a "retrieval request issuing function," for example.

The retrieval object selecting function can select a virtual database and a virtual table, and select an virtual item from a list of displayed selectable virtual items, to add the selected virtual item to extraction condition items or display items. In the example illustrated in FIG. 7, a state in which a virtual item "product" is selected from a virtual table "shipment results" included in a virtual database "sales performance" is selected and added to the extraction condition items and display items is shown.

When the extraction condition setting function selects an extraction condition item, various condition setting dialogs such as a numeric type, a character type, a date type, a menu selection type, and the like assigned to respective virtual items are displayed. Thus, the user can readily set an extraction condition according to an instruction on the screen.

The display item setting function can designate a display item to be displayed on a report of a retrieval result, and set designation of row/column in cross tabulation, priority order of the display item in sorting, arrangement order in sorting, presence/absence of a subtotal, and the like for the display item.

The retrieval request issuing function sets a subject name and the like of a report, and instructs execution of retrieval when all the settings are completed.

In this manner, a retrieval request is issued by the retrieval request issuing unit 31. The retrieval request issue by the retrieval request issuing unit 31 is sent to the virtual database unit 20 and transferred to the retrieval history management unit 34 as illustrated in FIG. 6.

(Report Output Unit)

The report output unit 32 can display a retrieval result acquired from the virtual database unit 20 in basically one table, graph or the like as a report on a user terminal, and output the retrieval result to the outside in a format such as spreadsheet software, a CSV file, or an HTML file.

The report output unit 32 also has a function of not only displaying a retrieval result directly but also rearranging a retrieval result to prepare a multi-dimensional and multi-level cube, and grouping and totaling a retrieval result by a specific item, a function of designating items on rows and columns for cross tabulation, a function of rearranging retrieved data by a specific item, a function of adding a value calculated from retrieved data, and the like.

The display item of a retrieval request allows data to be identified and classified, and is classified as an index item (dimension) that is a label of a row or a column or as a value item (measure) capable of defining an attribute to be analyzed and aggregating values. Normally, a report is output by displaying a value of each index item specified in a retrieval request, and displaying an aggregation value obtained by aggregation of value items by the index item.

Furthermore, an aggregation level can be set to an index item of a retrieval request. If a plurality of index items are at the same aggregation level, aggregation operation such as grouping and totaling is not performed on each individual index item but on a combination of index items with the same aggregation level all together.

In a case where two or more aggregation levels are set, when a certain aggregation level is specified by a user terminal (2), a report is output by displaying values in only index items at the aggregation level or higher, and displaying an aggregation value obtained by aggregation of only index items at the aggregation level or higher in the value items. When the user terminal (2) has selected specific data in the report at the aggregation level, detailed records of one level lower than the aggregation level are displayed on the user terminal (2). In this manner, when one record in an aggregate is selected, an operation of drill-down that is to expand and display detailed breakdown data of the record, or roll-up that is an operation opposite thereto can be readily made by setting the aggregation level.

In addition, slicing can be made by changing designation of an extraction condition contained in a retrieval request, and dicing can be made by changing designation of a display item contained in a retrieval request.

When data analysis operation is performed on a report via a user terminal 2, the report output unit 32 prepares a table, a graph or the like subjected to the data analysis operation, and provides the prepared report again to the user terminal 2.

As illustrated in FIG. 6, the report prepared by the report output unit 32 is transferred to the retrieval link unit 35 and the dashboard display unit 36.

(Library Management Unit)

The library management unit 33 retains retrieval requests prepared on the basis of retrieval requirements from users, and allows the retrieval requests to be shared by permitted users depending on the authorities of the users, so that the retrieval requests can be reused as retrieval templates for fixed retrieval. In addition, the library management unit 33 retains retrieval results associated with the retrieval requirements of previous retrievals performed by users, and allows a user and the other users to refer to the retrieval results as reports. This serves to assist sharing of information and analytical know-how among the users.

FIG. 8 illustrates an image of a screen when the library management unit 33 functions.

A library of retrieval requests is prepared in units of a virtual database in the present embodiment, or in units of a specific group of users, and displays a list of registered retrieval requests. A retrieval request registered in a library can be referred not only by the user who registered the retrieval request but also by users authorized to refer to the retrieval requests.

The library management unit 33 has a function of periodically executing scheduled retrievals. As a result of executing scheduled retrievals on the basis of designated retrieval requirements to periodically prepare retrieval results, such reports that general users use routinely can be prepared in advance without performing retrieval every time.

As illustrated in FIG. 6, a retrieval request prepared by a user is transferred to the retrieval request issuing unit 31 and the dashboard display unit 36 via the library management unit 33.

(Retrieval History Management Unit)

The retrieval history management unit 34 saves a retrieval result associated with a retrieval request for a certain period or a certain number of history record times on the basis of designation by the user terminal 2. Thus, as illustrated in FIG. 6, a retrieval request issued by the retrieval request issuing unit 31 and a retrieval result acquired from the virtual database 20 in response to the retrieval request are input to the retrieval history management unit 34.

When one of displayed retrieval requests is selected by a mouse or the like from a retrieval request library, recent retrieval date and time and the like are displayed as a menu of retrieval history if the retrieval request is designated as a retrieval request whose retrieval history is to be held. When a retrieval is selected from the menu, the report of the retrieval result is displayed on the screen. For performing a new retrieval, "new retrieval" is selected from the retrieval history menu.

Retrieval history can be specified to be retained for a certain period in units of years, months, weeks, days, or the like or retrieval results whose history counts have reached a certain number can be specified to be retained, and can be registered in the retrieval history management unit 34.

Use of these functions allows users having a variety of roles and skills to readily acquire standardized reports that are stable in quality without performing retrieval every time, and allows users to share information easily.

(Dashboard Display Unit)

The dashboard display unit 36 can arrange a plurality of tables and graphs within one screen to display information from various viewpoints required by a user together in one report on a display unit (display) of the user terminal 2. Individual tables and graphs within a dashboard are displayed by means of a retrieval request instruction unit and a report display unit, and thus can work basically independently. Dashboards are registered in a library similarly to retrieval requests, and can be reused as templates and used for reference to previous retrieval results.

(Function for Handling Data Including Inconsistency)

The present invention includes a function capable of handling data including inconsistency in addition to typical functions of business intelligence. The present invention thus includes the retrieval link unit 35 and a function for batch manipulation of a plurality of reports as functions for manipulating a plurality of reports over a plurality of retrieval results prepared from a plurality of retrieval requests in association of one another.

In addition, the present invention includes a function of defining a set of a plurality of related virtual items such as a master table as a class virtual item that can be used in common for a plurality of retrieval requests, so that virtual items can be easily associated and processed as common virtual items among different retrieval requests.

(Retrieval Link Unit)

The retrieval link unit 35 can also associate reports for different retrieval results with one another. The retrieval link unit 35 allows movement to another associated report while inheriting extraction conditions and selections of the current report to the associated report. FIG. 9 illustrates an image of screen operation of the retrieval link unit 35.

First, in the retrieval link unit 35, when one piece of data (record) in a table or a graph displayed on a user terminal is selected and an operation of clicking a mouse button, pressing a button, or the like is performed, a menu listing reports that can be linked is displayed. For example, in an example of "retrieval link from table" illustrated in FIG. 9, quantity: 120 of a product P of B Industry is selected from data (records) contained in a table of a report. As a result a new window has appeared, in which a menu of other reports such as "monthly change in sales," "details by persons in charge," and "sales profit ratio," which are liked from the selected data, is displayed.

When one report is then selected from the menu, the condition items and the condition values of the extraction conditions contained in the retrieval request of the currently displayed report, and the display items and the display values corresponding to the records selected in the retrieval result are inherited. Specifically, if an item that is the same as an inherited item is present in the extraction conditions of the retrieval request of the link destination, the condition values of the item are replaced with inherited condition values, the retrieval request of the link destination is then executed to acquire a retrieval result, and the screen is switched.

Reports displayed as a menu of a list of retrieval links are set by association of certain retrievals registered in the library with the retrieval request of the link source, and information on the reports on the menu is also saved when the retrieval request of the link source is saved in the library.

The association (links) of a plurality of reports as described above is based on the retrieval request definition information in the data dictionary 10. Specifically, in the data dictionary 10, the definition information of retrieval request defines that a plurality of retrieval requests that are different in databases from which data are to be retrieved or different in conditions for extracting data from databases have relevance with each other. Thus, the retrieval link unit 35 first refers to the retrieval request definition information in the data dictionary 10 to check whether a retrieval request is associated with another retrieval request in the definition information. As a result, the retrieval link unit 35 can recognize the relevance between a report prepared on the basis of a retrieval request and a report prepared on the basis of another retrieval request. When data of a report is specified, the retrieval link unit 35 then refers to the definition information on the relevance contained in the retrieval request in the data dictionary 10, and displays other reports having data associated with the specified data on a terminal used by the user. In this manner, the reports are linked.

Next, FIG. 10 illustrates a flowchart of a process for inheritance of extraction conditions and selections, which allows association of reports for different retrieval results with each other in the retrieval link unit 35.

First, the retrieval link unit 35 acquires one extraction condition from a retrieval request of a report that is a link source (S1). Subsequently, the retrieval link unit 35 refers to the data dictionary 10, and acquire one extraction condition from a retrieval request of a report that is a link destination (S2). The retrieval link unit 35 then refers to the data dictionary 10 to determine whether a virtual item of the extraction condition of the link source is associated with the virtual item of the extraction condition of the link destination as being the "same" (S3). If the virtual item of the extraction condition of the link source is associated with the virtual item of the extraction condition of the link destination as being the "same" in the data dictionary 1, the retrieval link unit 35 replaces condition values of the extraction condition of the link destination with condition values of the extraction condition of the link source (S4). In contrast, if the virtual item of the extraction condition of the link source is not the same as the virtual item of the extraction condition of the link destination, nothing is performed.

Subsequently, the retrieval link unit 35 similarly checks an extraction condition of a next link destination (S5). Here, if it is determined that extraction conditions of all link destinations have been checked, the process proceeds to checking of an extraction condition of a next link source (S6), or if it is determined that an unprocessed extraction condition is present in a retrieval request of a link destination, the process returns to step S2. Subsequently, in step S6, the extraction condition of the next link source is similarly checked (S6). Here, if it is determined that extraction conditions of all link sources have been checked, the process proceeds to the next step S7, or if it is determined that an unprocessed extraction condition is present in a retrieval request of a link source, the process returns to step S1.

Subsequently, the retrieval link unit 35 takes out a record selected by a mouse or the like on the screen from a retrieval result of a report that is a link source, and acquire one pair of a display item of the selected record and display values (S7). Subsequently, the retrieval link unit 35 acquires one extraction condition from a retrieval request of a report that is a link destination (S8). The retrieval link unit 35 then refers to the data dictionary 10 to determine whether a display item of the selected record of the link source is associated with a virtual item of an extraction condition of a link destination as being the "same" (S9). Here, if the display item of the selected record of the link source is associated with the virtual item of the extraction condition of the link destination as being the "same" in the data dictionary 10, the retrieval link unit 35 replaces condition values of the extraction condition of the link destination with the display values of the display item of the selected record of the link source (S10). In contrast, if the display item of the selected record of the link source is not the same as the virtual item of the extraction condition of the link destination, nothing is performed.

Hereinafter, the retrieval link unit 35 similarly checks an extraction condition of a next link destination (S11). Here, if it is determined that extraction conditions of all the link destinations have been checked, the process proceeds to checking of a selected record of a next link source (S12), or if it is determined that an unprocessed extraction condition is present in a retrieval request of the link source, the process returns to step S8. Subsequently, in step S12, a display item of the selected record of the next link source is similarly checked (S12). Here, if it is determined that display items of the selected records of all the link sources have been checked, the inheritance process is terminated, or if it is determined that an unprocessed display item is present in a selected record of a link source, the process returns to step S7.

Finally, the retrieval link unit 35 issues a retrieval request for retrieving a link destination report in which the extraction conditions are replaced to the virtual database unit 20 to acquire a retrieval result of the link destination with the inherited extraction conditions and selections.

Note that the determination on whether or not an item is associated as being "the same" is made on the basis of whether or not the definitions of virtual items (that is, the names of the items) are the same in the present embodiment when the retrieval request of the link source report and the retrieval request of the link destination report designate the same virtual database from which data are to be retrieved. As a result, inheritance of extraction conditions and selections between different reports is automatically carried out without individually defining association of items between respective retrieval requests, between respective retrieval results, or between respective reports.

In addition, even in a case where the link source retrieval request and the link destination retrieval request designate different virtual databases from which data are to be retrieved, the determination on the association can be made by referring to definition information of "the same virtual items in different virtual tables" added to the definition of the virtual items.

(Dashboard Linking Unit)

The dashboard linking unit 37 is capable of performing data analysis manipulations on a plurality of reports prepared from different retrieval results all together even in a dashboard in which a plurality of reports are arranged on one screen.

FIG. 11 illustrates an image of a screen for setting extraction condition linking between a plurality of reports in a dashboard.

For linking extraction conditions between a plurality of reports included in a dashboard, an "add condition" button is first selected to open a screen of "add dashboard extraction condition" (lower part of FIG. 11). Then, extraction conditions contained in the retrieval request of a report to which the extraction condition is to be linked is displayed on the screen of "add dashboard extraction condition". An extraction condition is then selected from the extraction conditions displayed on the screen so that the selected extraction condition is added to the dashboard extraction conditions. The dashboard extraction conditions to which the extraction condition is added is displayed on "list of dashboard extraction conditions" (left part of FIG. 11).

For example, in the example illustrated in FIG. 11, such an extraction condition as "product number" contained in the retrieval request in such a report as "list of sales by product" is to be linked to an extraction condition in another report. Thus, in the example of FIG. 11, an extraction condition item "product number" contained in the retrieval request of the report "list of sales by product" is first added to the dashboard extraction conditions.

Subsequently, when one of the dashboard extraction conditions is selected from the list on the dashboard, a list of reports containing the same extraction condition item as that of the selected extraction condition is displayed on a part called the "report linked with present extraction condition" (upper-right part of FIG. 11). Thus, whether or not to be linked with the extraction condition of another report is specified for each of the reports displayed under the "report linked with present extraction condition". As a result, the extraction conditions of a plurality of reports that can be linked can be set at the same time by one setting of extraction condition.

For example, in the example illustrated in FIG. 11, when such an extraction condition item as "product number" is selected from the list on the dashboard, reports such as "list of sales by product," "monthly change in sales," "performance by person in charge," and "sales ranking by customer" are displayed on the part of "report linked with present extraction condition" (upper-right part of FIG. 11). This means that the reports displayed here have the extraction conditions that can be linked with the extraction condition "product number". Thus, the reports whose extraction conditions are to be linked with the extraction condition "product number" can be freely selected from the displayed reports. Note that, in the example illustrated in FIG. 11, the extraction conditions of only the "list of sales by product" and the "monthly change in sales" are set to be linked.

Furthermore, for example, a plurality of extraction conditions having the same meaning but having different names can be linked with each other. For example, when a "link with another extraction condition" button illustrated in FIG. 11 is selected, the extraction condition items other than the extraction condition (product number) selected on the list on the dashboard are displayed in a form of a selectable list. Extraction condition items forced to be linked with the extraction condition (product number) selected on the list on the dashboard are then selected from the extraction condition items displayed here. In this manner, the extraction condition (product number) selected on the list on the dashboard and the other extraction condition items can be linked with one another. Note that the dashboard extraction conditions set to be linked with the extraction condition in this manner are no longer displayed on the list of extraction retrieval conditions during use, and the values of the dashboard extraction conditions of the link source are used as the values of the dashboard extraction conditions of the link destination in execution of retrieval.

In the example illustrated in FIG. 11, a dashboard extraction condition item "product identification code" is already defined on the dashboard. However, since this extraction condition item "product identification code" has the same meaning as the extraction condition item "product number" but is different in name therefrom, the extraction condition items are likely to be treated as different extraction condition items in computer processing. Thus, the "product identification code" and the "product number" are linked with each other at the "link with another extraction condition" part on the manipulation screen, which allows linking between different reports to be performed more correctly on the basis of an input operation from a user terminal.

Information on the extraction condition items whose link with each other are specified in this manner is registered in the presentation structure of the data dictionary 10. In this sense, the content of the data dictionary 10 (In particular, the link between extraction condition items) is updated on the basis of an input operation from a user terminal. Furthermore, the accuracy of information in the data dictionary 10 can be enhanced by actual use of the system according to the present invention.

Furthermore, use of the function of linking the extraction conditions between a plurality of reports enables to link not only with the setting of extraction conditions but also with the drill-down of the reports on the dashboard. In an initial state, dashboard extraction condition items are prepared with condition values being null. When instruction to perform drill-down on any of reports on the dashboard, if an item to be drilled down is a dashboard extraction condition item, the values of extraction conditions of a plurality of reports whose extraction conditions are to be linked are replaced with the values of instruction by drill-down, so that a plurality of reports on the dashboard can be drilled down in conjunction with one another.

(Class Virtual Item)

Master tables such as "customer," "product," and "employee" are mainly used to manage subject attributes, and have such characteristics that the structures thereof are defined independent of other data and that a plurality of associated items are typically manipulated together.

In the present invention, a function of a class virtual item defining a set of such a plurality of associated virtual items as one virtual item independent of virtual tables is provided.

For example, in a master table holding attributes such as codes and names, when a class virtual item is selected as a display item as a result of retrieval object selection by the retrieval request issuing unit 31, a plurality of virtual items (for example, codes, names, etc.) belonging to the class virtual item can be automatically added to the display items in the retrieval request. In addition, in setting extraction conditions by the retrieval request issuing unit 31, a menu including code, names, and the like, which is easy to recognize, is automatically displayed to the user, which enables such a navigation where only the code is added to the retrieval conditions when the user has selected a condition from the menu.

In addition, a hierarchical class virtual item can be defined for a set of a plurality of virtual items that are hierarchically associated with each other. With a hierarchical class virtual item, in setting of an extraction condition by a retrieval request instruction unit, when one value is selected from a menu of the values of items at an upper level, the values of items at a lower level associated with the selected value are displayed as a menu, and the user can specify a value to be an extraction condition for retrieval from the values displayed in a menu at any level, for example.

FIG. 12 illustrates an image of manipulation of a screen for setting an extraction condition using a class virtual item and hierarchical class virtual item.

As a result of defining a plurality of items belonging to a master table all together as a class virtual item that can be used in common in a plurality of virtual table, instead of individually defining the items of the master table as being subordinate to individual virtual tables, the values of extraction conditions and selection conditions are readily inherited as the same or associated virtual items even between retrieval results prepared from retrieval request to different virtual tables. Furthermore, even in different virtual tables, setting of the values of extraction conditions, selecting of display items, and the like during retrieval can also be performed through common guidance and manipulation procedures, which improves user friendliness.

<Configuration of Virtual Database Unit>

FIG. 13 illustrates a functional block diagram of the virtual database unit 20 in the present embodiment. As illustrated in FIG. 13, the virtual database 20 includes a retrieval request translation unit 21, retrieval instruction execution unit 22, and data integration processing unit 23.

The virtual database unit 20 is capable of performing a process of receiving a retrieval request prepared by the business intelligence unit 30, and returning data retrieved in the virtual database unit 20 as a retrieval result to the business intelligence unit 30. Alternatively, the virtual database unit 20 can be configured to receive a retrieval request prepared by entities other than the business intelligence unit 30, and can be configured to return a retrieval result to an external output destination other than the business intelligence unit 30.

The description format of a retrieval request received by the virtual database unit 20 includes a table to be retrieved, a list of items to be retrieved, designation of extraction conditions, designation of grouping, designation of a sorting order, an output destination of a retrieval result, designation of a format for displaying a retrieval result, and the like. A syntax obtained by extending a standard SQL syntax may be used, or alternatively, a specialized syntax may be used.

(Retrieval Request Translation Unit)

A retrieval request input to the virtual database unit 20 is first passed to the retrieval request translation unit 21. The retrieval request translation unit 21 is constituted by a retrieval request analysis function and a retrieval instruction generation function.

(Retrieval Request Analysis Function)

The retrieval request analysis function converts all the items appearing in the item list, the extraction conditions, the grouping designation, the sorting order designation, and the like of the input retrieval request into virtual items according to the virtual data structure definition information in the data dictionary 10. The retrieval request analysis function further eliminates overlapping virtual items, and prepare a unique set of virtual items to be included as subjects of retrieval.

Subsequently, the retrieval request translation unit 21 checks calculation tables for the extracted virtual item set on the basis of the calculation table application definition to detect one or more compliant calculation tables (hereinafter referred to as compliant calculation tables).

Normally, the calculation table application definition is expressed as a tree structure having one or more calculation tables under one calculation table at an upper level. Terminal nodes of the calculation table application definition are constituted by external calculation tables that retrieve data from databases, and the other upper-level node is constituted by an internal calculation table.

A case where an upper-level internal calculation table is defined on a lower-level internal calculation table refers to that an output of the data integration processing unit 23 corresponding to the lower-level internal calculation table is an input to the data integration processing unit 23 corresponding to the upper-level internal calculation table, so that data integration processing unit 23 is implemented in multiple stages.

Since an optimum compliant calculation table is detected following the calculation table application definition for each of the virtual items, different compliant calculation tables may be detected for different virtual items. In this case, respective data acquired by different retrieval instruction execution units or different data integration processing units are finally integrated and provided as one retrieval result at a stage where retrieval instructions generated from the different compliant calculation tables are executed.

The relation between an upper calculation table and a lower calculation table in the calculation table application definition can be selected from three relations which are merge relation, selection relation and reference relation in the present embodiment, which determines the data integration scheme in the data integration processing function.

The procedure of following the calculation table application definition to detect an optimum compliant calculation table is specifically as follows. Note that, in the description below, virtual items used for grouping designation or in an extraction condition will be referred to as key items, and the other virtual items will be written as attribute items.

(1) In a case where a list of calculation items in a calculation table includes all the key items included in a virtual item set and one or more attribute items included in the virtual item set, the calculation table is determined to be a compliant calculation table. Note that, in a case where a compliance condition such as determination based on condition values of extraction conditions is specified for individual calculation tables, a calculation table is determined to be a compliant calculation table only when retrieval requests satisfies the compliance condition.

(2) In a case where a plurality of calculation tables are defined in the merge relation at a lower level, attribute items compliant with a previous calculation table are left in a virtual item set for checking subsequent calculation tables.

(3) In a case where a plurality of calculation tables are defined in the selection relation at a lower level, attribute items compliant with a previous calculation table are excluded from a virtual item set for checking subsequent calculation tables.

(4) In a case where a calculation table is defined in the reference relation at a lower level, items in the lower-level calculation table are deemed to be capable of being calculated by an upper-level calculation table, and when a virtual item set includes an item of the lower-level calculation table, the lower-level calculation table as well as the upper-level calculation table are determined to be compliant calculation tables.

(5) The above procedures are checked sequentially from an uppermost-level calculation table to a calculation table at a next level, and then to a calculation table at a level after the next if the calculation table is compliant, and this is repeated. This is terminated when no attribute item is present in the virtual item set for checking subsequent calculation tables or when all the calculation table have been checked.

(Retrieval Instruction Generation Function)

One or more compliant calculation tables associated with a retrieval request obtained by the retrieval request translation unit 21 are passed to the retrieval instruction generation function. The retrieval instruction generation function depends on the compliant calculation tables, and if the compliant calculation tables are external reference tables, the retrieval instruction generation function generates a retrieval instruction that can be executed by a database 3 from which data are to be retrieved, and passes the retrieval instruction to the retrieval instruction execution unit 22. If the compliant calculation tables are internal reference tables, the retrieval instruction generation function generates one or more retrieval instructions that can be executed by the data integration processing unit 23, and passes the retrieval instructions to the data integration processing unit 23.

First, the retrieval instruction generation function defines calculation items compliant with the key items and attribute items of the virtual item set in each of the compliant calculation tables as a calculation item set in units of retrieval.

Subsequently, the retrieval instruction generation function develops a retrieval item list, grouping designation, sorting designation, and extraction conditions in each unit of desired retrieval according to a calculation definition formula for calculation items describing virtual item names by using a physical table and physical items.

In addition, if a plurality of physical tables are used in the calculation definition formula in the calculation table, a join condition between the physical tables is obtained from the physical table join definition, and added to a table reference formula.

Equations obtained by developing the formulae are substituted into instruction elements such as a retrieval item list, a grouping designation formula list, sorting designation formula list, a table reference formula, and an extraction condition formula, whose calculation syntaxes for databases from which data are to be retrieved are being defined, so that one of executable retrieval instructions is generated.

The above processes are repeated the number of times corresponding to the number of compliant calculation tables, so that a series of set of normalized retrieval instructions can be obtained.

Note that, while the retrieval instruction generation function generates one retrieval instruction from one compliant calculation table in the present embodiment, a plurality of retrieval instructions can be generated from one compliant calculation table or one retrieval instruction can be generated from a plurality of compliant calculation tables.

(Retrieval Instruction Execution Unit)

The retrieval instruction execution unit 22 executes one or more retrieval instructions prepared by the retrieval instruction generation function of the retrieval request translation unit 21 on a database 1, acquires retrieved data in response to each of the retrieval instructions and stores the retrieved data in a temporary storage area, and sends the retrieved data to the data integration processing function of the data integration processing unit 23.

In a case where the database 1 supports the SQL language as a retrieval interface, at least one of a retrieval instruction execution unit for retrieval using the SQL from a physical table of the database 1, a retrieval instruction execution unit for retrieval using a stored procedure stored in the database 1, and a retrieval instruction execution unit that retrieves a retrieval result again from a retrieval result of retrieval defined directly by the SQL language of the database 1 may be provided.

In a case where the database 1 does not support the SQL language as a retrieval interface, a retrieval instruction execution unit corresponding to a retrieval interface of the database 1 may be provided, or if the database 1 is a data file on a file system, a retrieval instruction execution unit corresponding to the data file may be provided.

The temporary storage area for the retrieved data may be a temporary table on the database 1, a temporary table on a specific working database, a temporary file on a magnetic storage medium, or a storage area in a memory, for example.

(Data Integration Processing Unit)

The data integration processing unit 23 executes data integration and data processing on the basis of a retrieval instruction corresponding to an internal calculation table generated by the retrieval request translation unit 21.

Data resulting from the data integration and data processing are sent as a retrieval result in response to the retrieval request to the business intelligence unit 30 or an output destination other than the business intelligence unit 30.

The result data can be output to a table in the database, which is an output destination other than the business intelligence unit 30, for example. Alternatively, the result data can be output to a data file stored in a file system, a data stream transmitted via a network, or the like. In this case, the format in which the result data are output can be a comma separated value (CSV) format, an HTML format, an XML format, or a spreadsheet format, for example.

In a simplest configuration example, the data integration processing unit 23 receives as input one or more of a plurality of intermediate retrieved data prepared by division during the processing process in the retrieval instruction execution unit 22, performs data integration and data processing, and outputs result data in a form of one table.

In a more complicated configuration example, result data output by a data integration processing unit 23 can be passed on as an input to another data integration processing unit 23.

In a case where a plurality of retrieval instructions corresponding to an internal calculation table are issued, the processing of the data integration processing unit 23 is sequentially repeated by passing result data output by a previous data integration processing unit 23 as an input to a subsequent data integration processing unit 23 according to an order as instructed in the retrieval instructions. In this manner, the processing in the data integration processing unit 23 can be executed in multiple stages.

The functions of the data integration processing unit 23 includes a data integration processing function, and a data processing function for processing integrated data.

(Data Integration Processing Function)

The data integration processing function performs data integration to prepare one piece of table data on the basis of one or more intermediate data.

The data integration processing function has data integration schemes including a merge scheme, a selection scheme, and a reference scheme, and uses an optimum scheme or a combination of the schemes selected therefrom.

How the data integration schemes are used for a virtual table specified in a retrieval request is described in the calculation table application definition for a virtual table in the data dictionary 10.

FIG. 14 illustrates a conceptual diagram of processing in a plurality of data integration schemes.

In a merge scheme (UNION), a plurality of retrieval instructions are generated from a plurality of calculation tables applicable to a retrieval request, the retrieval instructions are executed in parallel, and all of a plurality of retrieved data extracted as a result of execution are first merged into data of one table. The retrieved data of the calculation tables all include common key items but only some of the retrieved data include attribute items. Thus, the table data are grouped by all of the included key items and values of the attribute items are aggregated for each group, so that redundant portions (non-normality) where all the key items overlap are removed. The method for aggregating the attribute items may be, unless otherwise specified, totaling numerical data while performing maximum calculation of selecting a valid value from null and valid values on data other than numerical data. The aggregation method, however, can be specified individually for each data dictionary.

In the example shown in the merge scheme in FIG. 14, it is requested that a retrieval result has "customer" and "product" as key items, and both of retrieved data 1 and retrieved data 2 meets this requirement by both including records having values of "customer 1" and "product 1". Next, since the value of unit price, which is an attribute item, is only present in the retrieved data 1, aggregation is performed to obtain "unit price 1" as a value of the retrieval result. In addition, since the values of quantity are present in both of the retrieved data 1 and the retrieved data 2, aggregation is performed by totaling numerical data to obtain "quantity 1+quantity 2" as a value of the retrieval result.

The merge scheme is high in processing performance since retrieved data can be acquired from respective databases by issuing one retrieval instruction and a plurality of retrieval instructions can be executed in parallel. In the merge scheme, however, all the key items necessary for aggregation are required to be included in the acquired retrieved data.

In a selection scheme (CHOICE), a plurality of calculation tables applicable to a retrieval request are checked according to priority, a calculation table of the highest priority, which includes an attribute item, is selected, provided that the calculation table includes all the requested key items, and a retrieval instruction is generated and executed to acquire retrieved data. In a case where a plurality of retrieval instructions are generated for a plurality of attribute items, a plurality of retrieved data extracted by executing the respective retrieval instructions are grouped and aggregated similarly to the merge scheme, so that redundant portions are removed.

In the example shown in the selection scheme in FIG. 14, it is requested that a retrieval result has "customer" and "product" as key items. Since retrieved data 1 only has "customer" as a key item, retrieved data 1 is not to be retrieved. Next, since retrieved data 2 includes "customer" and "product" as key items, attribute items "unit price" and "quantity" are also acquired therefrom. Determination is terminated here since all the attribute items are acquired as a result. If, however, some of the attribute items cannot be acquired, similar determination is further continued.

The selection scheme is capable of improving the efficiency of retrieval of detailed data stored in a database by automatically selecting a calculation table that meets a given retrieval request and that retrieves data at the highest aggregation level in a case where aggregated data at one or more levels are also prepared and stored in the database.

In a reference scheme (LOOKUP), one calculation table is associated with one or more calculation tables to be referred to. Retrieval is performed on each of records of retrieved data acquired by generating and executing a retrieval instruction for the original one calculation table, on the basis of reference conditions defined by the calculation table application definition for each of the calculation tables to be referred to so as to obtain reference data, and values of items in the reference data corresponding to items missing in the original retrieved data are copied, so that result data are calculated using a plurality of retrieved data.

In the example shown in the reference scheme in FIG. 14, "customer," "product," and "quantity" are acquired in the first retrieved data 1, but the item of "unit price" is missing. If a reference condition for retrieved data 2 is that "product in the retrieved data 1 has the same value as product in retrieved data 2 has," the value "product 1" of product obtained in the retrieved data 1 is used as a condition for referring to the retrieved data 2 and the obtained value "unit price 1" of unit price is copied to the value of unit price in the retrieval result.

The reference scheme has advantages in that, in a case where some of aggregation keys necessary for retrieved data acquired as a result of executing one retrieval instruction are not included, another retrieval instruction can be executed to acquire associated retrieved data and supplement missing keys before performing aggregation.

(Reference Processing Schemes)

In the reference scheme, retrieval is performed according to a defined reference condition to acquire reference data. Since, however, a reference condition includes an item of a reference source as a variable of a condition formula, retrieval cannot be executed directly on a referenced database if the database of the reference source is different from the referenced database. Thus, the reference processing scheme between different databases needs to be a system different from that of joining processing (JOIN) in a normal database.

In the present embodiment, three processing schemes are included as the reference processing schemes: a successive reference scheme, a batch join scheme, and a sequential merge scheme. FIGS. 15A and 15B illustrate conceptual diagrams of processing in these reference processing schemes.

In the successive reference scheme, records are acquired one by one from retrieved data acquired by generating and executing one retrieval instruction. For performing retrieval by using the records as reference sources, items of the reference source included as variables in condition formulae of the reference condition are replaced by the item values of the records. The reference condition, thus obtained, is added to the retrieval instruction, retrieved data of the referenced database are acquired, and result data are calculated by joining the records of the both. The above described procedures are successively repeated for all of the acquired retrieved data.

Since the number of retrieval instructions required for reference is the number of retrieved data of the reference source in principle, the processing time tends to be long in particular when a large amount of data are to be referred to. It is, however, possible to combine a plurality of records of the retrieved data of the reference source together into a join condition of one retrieval instruction for reference, instead of one by one record of the retrieved data of the reference source. In this case the number of retrieval instructions to be issued is [the number of retrieved data of the reference source÷the number of records per one reference].

In the batch join scheme, data that are subject of retrieval of the reference source and data that are subject of retrieval of the referenced database are all temporarily stored in one working database, and a retrieval instruction for performing join (JOIN) processing on the working database is issued to calculate result data all together. A sufficient working area is required in the working database, and processing procedures are typically complicated.

The processing efficiency of the batch join scheme depends largely on the efficiency of transferring data to be subjected to the join processing to the working database, in particular on the writing efficiency, since the join processing in the working database is typically performed at a significantly high speed. The working database may be any of the databases from which data are to be retrieved. Thus, if either one of the reference source and the referenced database has a large amount of data while the other has a small amount of data, the data in the database having the smaller amount of data can be transferred to the database having the larger amount of data, which allows high-speed processing without transferring a large amount of data. In addition, data that are less often updated and have no problem in being statically held can be transferred in advance to the working database, which improves the processing efficiency of reference retrieval.

In the sequential merge scheme, data that are subject of retrieval of the reference source and data that are subject of retrieval of the referenced database are rearranged in advance in the order of condition values of a reference condition, and while the data are sequentially read thereafter, the condition values of the reference conditions of a reference source record and a referenced database record are compared, and result data of those with the same condition values are obtained.

FIG. 16 illustrates an example of a concept of processing in the sequential merge scheme. Reference source data include "ship-to code," "product code" and "quantity". Referenced database data 1 include "ship-to code" and "destination name". The reference condition for the reference source data and the referenced database data 1 is "reference source data. ship-to code=referenced database data 1. ship-to code". Thus, the reference source data are rearranged according to the ship-to code, and the referenced database data 1 are rearranged according to the ship-to code. Thereafter, the reference source data and the referenced database data 1 are sequentially read. In records having the same ship-to code, the destination names are copied from the referenced database data 1 and the other items are copied from the reference source data, and intermediate data are thus prepared.

Subsequently, the intermediate data and referenced database data 2 are rearranged similarly according to the product codes. Thereafter, the intermediate data and the referenced database data 2 are sequentially read. in records having the same product code, the product names and the unit prices are copied from the referenced database data 2 and the other items are copied from the intermediate data, and result data are thus prepared. If a plurality of records having the same condition values are resent in the reference source data or the referenced database data, result data are prepared for each of the records, which means that a plurality of result data will be output.

FIG. 17 illustrates a flowchart of specific processing in the sequential merge scheme.

First, the reference source data are rearranged according to all the items of the reference source included in a reference condition, and the referenced database data are rearranged according to all the items of the referenced database included in the reference condition. In this process, the order of rearrangement is ascending order of the condition values of the reference condition. (In a case of descending order, the relation of magnitudes of values in the following description should be reversed.)

Subsequently, one record is read from the reference source. A record is also read from the referenced database. When a plurality of records having the same condition value are present, all the records having the same condition value are read as a record set.

The magnitude of a condition value of the reference condition based on the item values of a reference source record and the magnitude of a condition value of the reference condition based on the item values of a referenced database record are compared. If the condition value of the reference source record is smaller, a next reference source record is read and the magnitudes of the condition values are compared again. If the condition value of the referenced database record set is smaller, a next referenced database record set is read, and the magnitudes of the condition values are compared again.

If the condition values are equal, that is, if the reference condition is satisfied, one record is taken from the referenced database record set as a referenced database record, values of items missing from the reference source record are copied from the referenced database record, and result data are output. This process is repeated for all the records in the referenced database record set. As a result, when one record of the reference source corresponds to n records of the referenced database, result data are output for n records. If the processing of the record set is completed, a next reference source record is read and the magnitudes of the condition values are compared again.

Note that, since the referenced database record set is left after a record is output, if the condition values of m records of the reference source correspond to the condition values of a record set including n records of the referenced database, result data are output for m×n records. This result is equivalent to that of the join processing on records including key duplication in the SQL.

Subsequently, this procedure is repeated until processing of all the reference source records or all the referenced database records is completed.

The processing time of the sequential merge scheme is very stable because a reference process is completed by sequentially reading all records once, although data to be retrieved needs to be rearranged in advance. If, however, only some of all the records are necessary, this is not very suitable since reading of all the records is needed.

In addition, this is suitable for processing a large amount of data since all the processes including the rearrangement process and the reference condition comparison process can be constituted by sequential processes and memory consumption is thus very small. In particular, the sequential merge scheme produces a significant effect in such a case where a plurality of large data need to be joined.

As described above, for the data integration scheme, an optimum integration scheme can be selected or a combination of a plurality of integration schemes can be used from a plurality of schemes. Similarly, for the processing scheme when the integration scheme is the reference scheme, an optimum reference processing scheme can be selected or a plurality of reference processing schemes can be used from a plurality of schemes. An optimum integration processing efficiency can be achieved in various situations.

(Data Processing Function)

The data processing function performs the following processes on one piece of table data obtained by the data integration processing function, and outputs the resulting data as result data compliant with the content of a retrieval instruction:

(1) a classification and aggregation process of grouping data by key items and aggregating the values of attribute items for each group;

(2) if the retrieval instruction specifies data editing, a data editing process such as numerical calculation, character string manipulation, date conversion, and code conversion;

(3) if a data extraction condition is specified, a data extraction process of specifying a specific value range condition, pattern matching of character strings, and the like; and (4) if the retrieval instruction specifies an outputting order, a sorting process.

In addition, the data processing function can have a function of performing computation dependent on the relation and the order of records that is difficult to process by a scholar operation within a record. Examples of such a function are as follows:

(1) an accumulation process such as a total of a first record, a total of first and second records, and a total of first, second, and third records;

(2) a shifted accumulation process such as a total of a first record, a total of first and second records, a total of second and third records, and a total of third and fourth records;

(3) a subtraction process such as a value of a first record, a subtraction between second and first records, and a subtraction between third and second records;

(4) a process based on record numbering such as a head value, an end value, an n-th value from the head, and an n-th value form the end;

(5) a process based on the order of records such as a previous record, and an immediately following record; and (6) a statistical process such as distribution, correlation, estimation, and testing.

Some of such processes can be implemented by using SQL analytical functions, but the processes are not suitable for processing a large amount of data since the SQL analytical functions are processed on a memory in a normal database engine where the amount of data that can be processed is limited. The data processing function in the present embodiment is on the assumption of stream processing, and thus has advantages in being very low in memory consumption and suitable for processing of a large amount of data.

(Optimization of Retrieval Instruction Generation Function)

In addition, the data integration processing unit 23 performs data integration and data processing on the basis of a plurality of intermediate retrieved data acquired by the retrieval instruction execution unit 22. Thus, it is important that the retrieval instruction generation function of the retrieval request translation unit 21 generate retrieval instructions so that the number of records in the result data from the database to be processed is a minimum number. This reduces communication overhead caused by transfer of result data and improves the processing efficiency of the data integration processing unit 23. Thus, the retrieval instruction generation function operates as follows.

Some of extraction conditions for a virtual database unit specified in retrieval requests are converted and applied into retrieval instructions, if possible. This narrows data to be retrieved and data to be returned as retrieval results.

Some of classification and totaling processes requested in retrieval requests are dealt in such a manner that classification and totaling are performed in advance according to a retrieval instruction to a database so that retrieval results are aggregated, if possible. This reduces the number of data in retrieval results output from databases.

In addition, a process of referring to a master table managing static attributes that are not subjected to data update often such as code/name conversion is not performed during retrieval of detailed data where the number of data in the database is large but performed on data after aggregation where the number of data is small. This reduces the number of reference processes.

(Data Cache)

Furthermore, the data integration processing unit can include a mechanism for caching retrieved data for the purpose of increasing retrieval processing efficiency. FIG. 18 illustrates a conceptual diagram of processing of a retrieved data cache. The retrieved data cache is implemented by preparing in advance table data resulting from the data integration process or intermediate retrieved data prepared by division during the processing process in a retrieval execution function of a database, storing the prepared data in an external storage area for the retrieved data cache, and referring to data in the external storage area for the retrieved data cache instead of the database during retrieval execution.

The timing when data are stored in advance in the external storage area for the retrieved data cache can be freely set, such as on a certain date and time specified by an administrator, at initial retrieval performed by a user, or when activated by an external event such as data update. In a case where a term of validity of the retrieved data cache is set by an administrator and the validity term has expired, the retrieved data cache can be reprepared.

In addition, the range of the retrieved data cache to be prepared includes all the items that can be selected by a user in units of a virtual table or a calculation table and all the values of the extraction conditions that can be specified by the user. As a result, the retrieved data cache is valid for all retrievals from virtual tables or calculation tables, which increases the retrieval processing efficiency.

(Effects of Using Data Integration Processing Units in Multiple Stages)

The present invention has a function capable of performing the processing in the data integration processing unit 23 in multiple stages. The necessity of such data integration processing in multiple stages occurs in such cases where the number of specific objects is to be obtained, where a ratio to total is to be obtained, where an occurrence rate is to be obtained, and where only n upper-level/lower/level data are to be output, and occurs often at a stage of statistical processing such as indexing of retrieval results in particular.

In addition, in a case where a complicated statistical process is performed on a large amount of data, there are many cases where data integration processing needs to be divided into steps in terms of processing efficiency.

In the present invention, the calculation table application definition of the data dictionary defines multi-stage data integration processing together with the virtual item to be applied. As a result, the number of stages of data integration processing is automatically determined for each virtual item according to a retrieval request from a user, and an appropriate number of states of data integration processing can be performed.

An image of processing including a multi-stage data integration processing unit will be described on the basis of FIG. 19.

A database stores a plurality of shipment data (physical tables: T1 and T2) divided for each dealer, and each of the shipment data contains items corresponding to product, ship-to, and shipment quantity. T1 and T2, however, are different in the data formats such as the parts " . . . " that are not used for retrieval and the names of registered items ("dealer name" and "dealer," "product name" and "product," etc.). Assume that a final retrieval result in which the shipment quantity and the number of destinations are totaled for each product as shown by R is desired to be obtained from a database built to include T1 and T2.

First, for acquiring the shipment quantity for each product, a plurality of retrieved data obtained by extracting necessary data from T1 and T2 are integrated into one table by associating items having different names with each other on the basis of the data dictionary, and total the integrated data for each product. As a result, first result data (V1) in which the shipment quantity is counted for each product is are obtained. In this case, the number of executions of the data integration processing unit is one.

In contrast, for acquiring the number of destinations and the shipment quantity for each product, it is necessary to once aggregate data acquired from T1 and T2 and integrated into one table for each product and each destination (V2) to remove overlapping destinations, and then count the number of destinations for each product to obtain second result data (V3). Thus, two executions of the data integration processing unit are required including data aggregation for each product and each destination and count of the number of destinations.

Data of the first result data (V1) and the second result data (V3) are then put together to obtain the final result data R responding to the retrieval request.

Note that the number of stages of the data integration processing necessary for obtaining the retrieval result is automatically determined on the basis of the data dictionary, and the user therefore need not be conscious thereof.

As a result of achieving multi-stage data integration processing in the present invention, the user can readily acquire reports including complicated or sophisticated statistical processes, which have been difficult to acquire directly from databases, only by issuing retrieval requests. This eliminates the need for manual data processing beforehand or afterward. Thus, the present invention has an advantage of being capable of flexibly coping with more complicated or sophisticated retrieval requirements than those of conventional virtual databases.

Herein, an embodiment of the present invention has been described above with reference to the drawings to express details of the present invention. The present invention, however, is not limited to the above-described embodiment but includes modifications and improvements obvious to those skilled in the art based on the disclosure provided herein.

REFERENCE SIGNS LIST 1 database
2 user terminal
3 administrator terminal
10 data dictionary
20 virtual database unit
21 retrieval request translation unit
22 retrieval instruction execution unit
23 data integration processing unit
30 business intelligence unit
31 retrieval request issuing unit
32 report output unit
33 dashboard unit
34 library management unit
40 data dictionary editing unit
100 data retrieval apparatus

The invention claimed is:

1. A data retrieval apparatus that retrieves data from two or more databases that return retrieved data in response to a retrieval instruction, the data retrieval apparatus comprising:
 a processor;
 a memory that stores a data dictionary, the data dictionary including:
  presentation structure definition information for assisting an input of a user terminal to issue a retrieval request compliant with a retrieval requirement, and
  retrieval request definition information for managing relevance between different retrieval requests; and
 a business intelligence circuit that
  assists an input of the user terminal to issue a retrieval request described according to a presentation structure defined in the data dictionary, and
  outputs a retrieval result based on the retrieval request, the retrieval result being obtained from the databases, to the user terminal,
 wherein the data retrieval apparatus associates a plurality of retrieval results prepared in response to the different retrieval requests with each other according to the retrieval request definition information.

2. The data retrieval apparatus according to claim 1, wherein the business intelligence circuit includes:
 a retrieval request issuing circuit that assists the user terminal to issue a retrieval request based on the presentation structure according to the presentation structure in the data dictionary; and
 a report output circuit that prepares a report from the retrieval result, and sends the report to the user terminal.

3. The data retrieval apparatus according to claim 2, wherein the business intelligence circuit is further configured to:
 display a plurality of reports prepared from the plurality of retrieval results acquired by executing the different retrieval requests sequentially or simultaneously; and
 associate and manipulate the plurality of reports with each other according to the retrieval request definition information that manages the relevance between the different retrieval requests contained in the data dictionary.

4. The data retrieval apparatus according to claim 2, wherein the business intelligence circuit is further configured to:
 associate a first retrieval request with a second retrieval request as a relevant retrieval; and
 execute the first retrieval request to display a first retrieval result in the user terminal, and thereafter select data contained in the first retrieval result and instruct a link to the second retrieval request to:
  inherit an item and a condition value of an extraction condition contained in the first retrieval request and an item and a display value associated with the data selected from the first retrieval result to the second retrieval request; and
  when an associated item associated with the item inherited from the first retrieval request is present in an extraction condition of the second retrieval request,
   replace a condition value of the associated item with the condition value inherited from the first retrieval request,
  execute the second retrieval request, and
  display a second retrieval result.

5. The data retrieval apparatus according to claim 3, wherein the business intelligence circuit is further configured to:
 prepare a dashboard including the plurality of reports prepared from the plurality of retrieval results, the plurality of reports being arranged on one screen;
 when data contained in a retrieval result of one of the plurality of reports is included in the dashboard, inherit an index item and a display value associated with the data contained in the retrieval result to another report within the dashboard; and when an item associated with the index item inherited to an extraction condition of a retrieval request of the another report is present,
replace a condition value of the extraction condition with a display value to which the condition value is inherited, and
execute a retrieval request to display a new retrieval result to manipulate the plurality of reports within the dashboard in conjunction with each other.

6. The data retrieval apparatus according to claim 2, wherein the report output circuit of the business intelligence circuit is further configured to:
perform an aggregation operation on a combination of index items with same aggregation level all together when a retrieval request contains a plurality of classifiable index items and one or more aggregable value items,
when two or more aggregation levels are set,
in displaying a retrieval result at a certain aggregation level on the user terminal, display only values of index items at a level higher than the certain aggregation level, and display an aggregation value obtained by aggregation of only index items at a level higher than the certain aggregation level in the value items; and
when the user terminal has selected specific data in the retrieval result at the certain aggregation level, display detailed records at an aggregation level lower by one level having an index item equal to the displayed index item of the selected specific data on the user terminal.

7. The data retrieval apparatus according to claim 2, wherein
the business intelligence circuit includes a library management circuit configured to save a retrieval request once prepared by the user terminal and read the retrieval request for reuse, and
the business intelligence circuit sets a user terminal configured to use the library management circuit according to user authority to allow the retrieval request to be shared depending on a purpose of use.

8. The data retrieval apparatus according to claim 2, wherein
the business intelligence circuit includes a retrieval history management circuit configured to save a retrieval result responding to a retrieval request for a predetermined period or for a predetermined number of history records specified by the user terminal, and
when the user terminal has specified a retrieval request from a library, a list of retrieval results responding to the retrieval request is displayed, and a retrieval result is specified from the list to allow direct access to the retrieval result.

9. The data retrieval apparatus according to claim 2, wherein
the retrieval request issuing circuit is further configured to handle a set item expressing a plurality of associated items by one concept,
when the set item is specified in an extraction condition of a retrieval request, the retrieval request issuing circuit is further configured to set a condition value while referring to values of the associated items included in the set item, and
the associated items included in the set item are automatically added to a display item of a retrieval result by an input operation of the user terminal to add the set item to the display item of the retrieval result.

10. The data retrieval apparatus according to claim 9, wherein
the set item of the retrieval request issuing circuit is constituted by one or more items in hierarchical relation with each other,
when a value is selected from a list of items at an upper level on a screen of the user terminal, a list of values of items at a lower level associated with the selected value is displayed, and
the user terminal is configured to specify a value to be an extraction condition for retrieval from the values displayed on the list of any level.

11. A non-transitory computer-readable recording medium storing a program causing a computer to function as a data retrieval apparatus that retrieves data from two or more databases that return retrieved data in response to a retrieval instruction, the program causing the computer to function as:
a data dictionary including
presentation structure definition information for assisting an input of a user terminal to issue a retrieval request compliant with a retrieval requirement, and
retrieval request definition information for managing relevance between different retrieval requests; and
a business intelligence circuit that
assists an input of the user terminal to issue a retrieval request described according to a presentation structure defined in the data dictionary, and
outputs a retrieval result based on the retrieval result, the retrieval result being obtained from the two or more databases, to the user terminal,
wherein the data retrieval apparatus associates a plurality of retrieval results prepared in response to the different retrieval requests with each other according to the retrieval request definition information.

12. The non-transitory computer-readable recording medium according to claim 11, wherein
when the plurality of retrieval results in response to the different retrieval requests is prepared according to the retrieval request definition information, the computer automatically associates the prepared retrieval results with each other, and
the business intelligence circuit prepares a plurality of reports respectively from the associated retrieval results, and automatically associates the prepared plurality of reports with each other.

13. A method of analyzing data using a retrieval apparatus that retrieves data from two or more databases that return retrieved data in response to a retrieval instruction, the method comprising:
storing, in a memory of the retrieval apparatus, a data dictionary, the data dictionary including;
presentation structure definition information for assisting an input of a user terminal to issue a retrieval request compliant with a retrieval requirement, and
retrieval request definition information for managing relevance between different retrieval requests; and
assisting, by the retrieval apparatus, an input of the user terminal to issue a retrieval request described according to a presentation structure defined in the data dictionary,
obtaining, by the retrieval apparatus and from the databases, a retrieval result based on the retrieval request,
outputting, by the retrieval apparatus and to the user terminal, the retrieval result based on the retrieval request, and associating, by the retrieval apparatus, a plurality of retrieval results prepared in response to different retrieval requests with each other according to the retrieval request definition information.

14. The data retrieval apparatus according to claim 1, wherein the business intelligence circuit is further configured to:

prepare a plurality of reports prepared from the plurality of retrieval results, and automatically associates the prepared plurality of reports with each other, the plurality of reports including a first report and a second report, move from the first report to the second report automatically and without human intervention by associating the first report and the second report for different retrieval results, with one another, allow a movement to the second report while inheriting extraction conditions and selections of the first report to the associated report, link reports based on the retrieval request definition information in the data dictionary, the retrieval request definition information defining a plurality of retrieval requests that are different in databases from which data are to be retrieved or different in conditions for extracting data from the databases have relevance with each other, and refer to the retrieval request definition information in the data dictionary for checking whether a retrieval request is associated with another retrieval request in the retrieval request definition information and display the second report having data associated with specified data on the user terminal used by the user in the first report.

* * * * *